United States Patent [19]
Hayashi et al.

[11] Patent Number: 5,009,451
[45] Date of Patent: Apr. 23, 1991

[54] SHOCK ABSORBER FOR USE IN A VEHICLE

[75] Inventors: Yasuyuki Hayashi, Fukuroi; Shigenobu Abe, Hamamatsu, both of Japan

[73] Assignee: Kabushiki Kaisha Showa Seisakusho, Tokyo, Japan

[21] Appl. No.: 376,879

[22] Filed: Jul. 7, 1989

[30] Foreign Application Priority Data

| Jul. 19, 1988 | [JP] | Japan | 63-178131 |
| Aug. 19, 1988 | [JP] | Japan | 63-108291[U] |
| Sep. 14, 1988 | [JP] | Japan | 63-119876[U] |

[51] Int. Cl.$^5$ ............................................. B60G 11/14
[52] U.S. Cl. .................................. 280/724; 280/670; 280/276; 280/284; 280/43.18; 180/219; 188/321.11; 267/221
[58] Field of Search ............... 280/840, 6.12, 6.11, 280/688, 690, 697, 698, 701, 702, 704, 709, 710, 715, 724, 725, 43, 43.18, 670, 43.23, 276, 284; 180/219; 188/321.11; 267/221

[56] References Cited

U.S. PATENT DOCUMENTS

| 1,340,416 | 5/1920 | Schneider | 280/43.18 |
| 1,340,417 | 5/1920 | Schneider | 280/43.18 |
| 2,560,625 | 7/1951 | Boggs, Jr. et al. | 280/43.18 |
| 3,218,088 | 11/1965 | Nallinger et al. | 280/840 |
| 3,414,278 | 12/1968 | Schmid | 280/840 |
| 3,542,387 | 11/1970 | Schmid | 280/840 |
| 3,628,810 | 12/1971 | Graef | 280/710 |

FOREIGN PATENT DOCUMENTS 1040170 12/1966 United Kingdom ............... 280/840

Primary Examiner—Charles A. Marmor
Assistant Examiner—Tamara L. Finlay
Attorney, Agent, or Firm—Kane, Dalsimer, Sullivan, Kurucz, Levy, Eisele and Richard

[57] ABSTRACT

A shock absorber according to the present invention for use in a vehicle for cushioning a vibration generating between a vehicle body and an axle, in which a suspension spring is disposed between one member which may serve as a mass below the spring and the other member which may serve as a mass above the spring, has an apparatus for adjusting the height of vehicle permits its mounting length to be adjusted without changing an initially set load of the suspension spring while being relatively displaced with respect to the one member so that a stroke of the shock absorber may be changed.

3 Claims, 15 Drawing Sheets

FIG. 2
FIG. 3
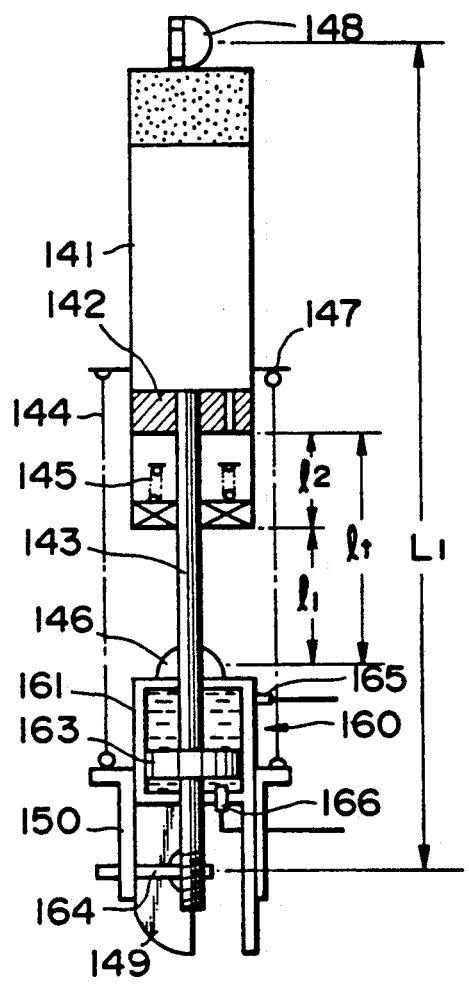
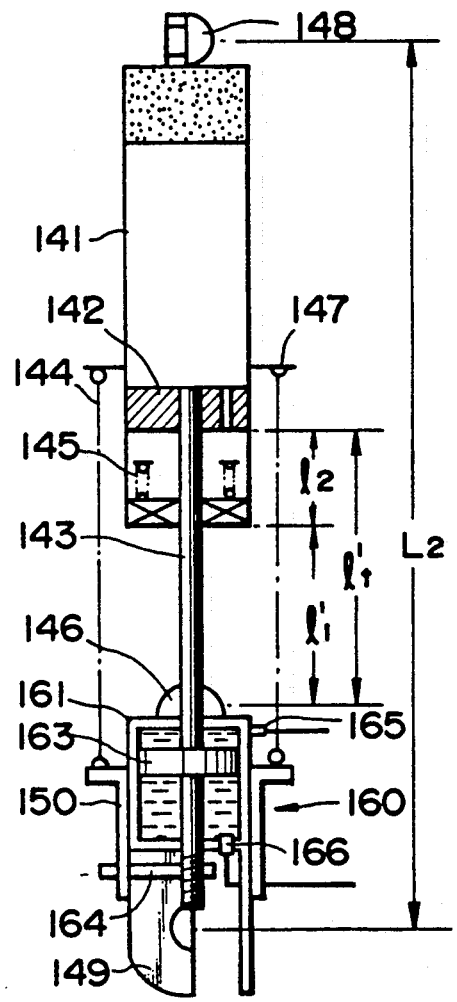

FIG. 5
FIG. 6
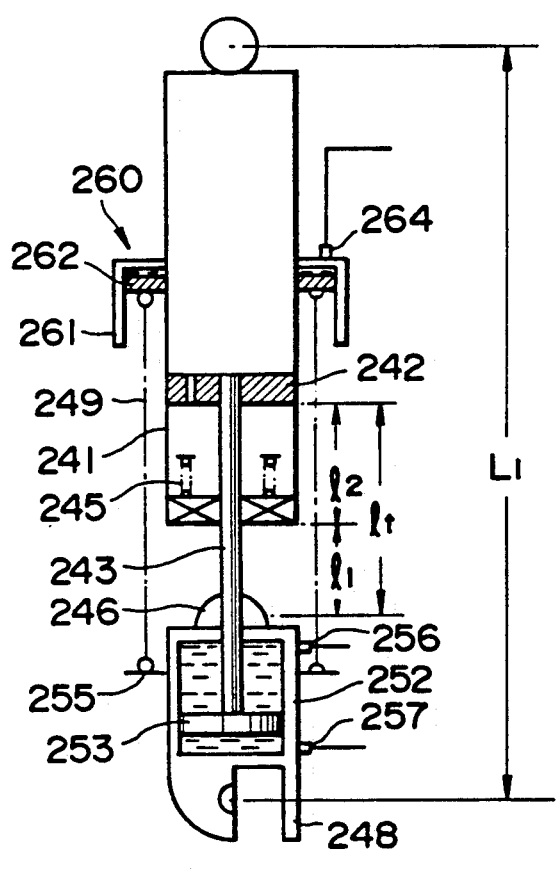
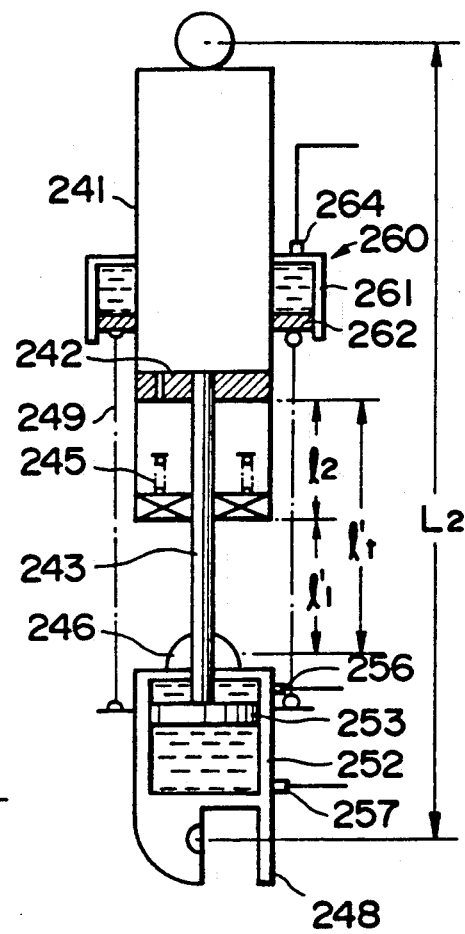

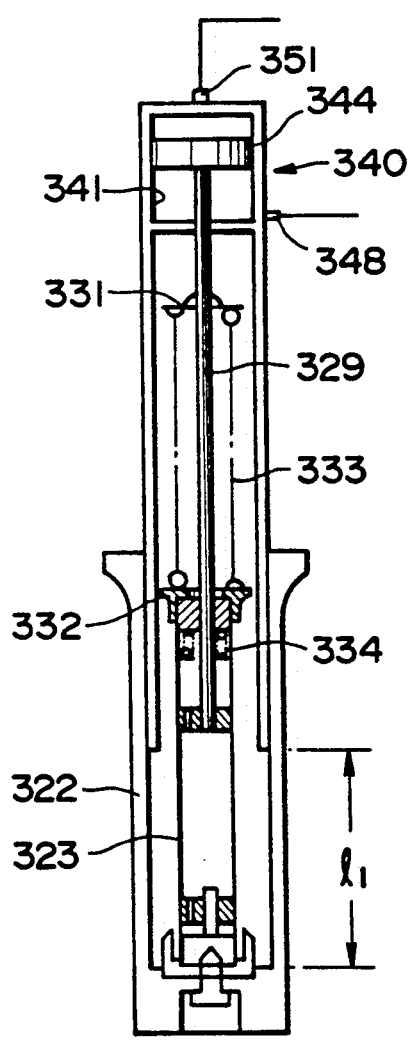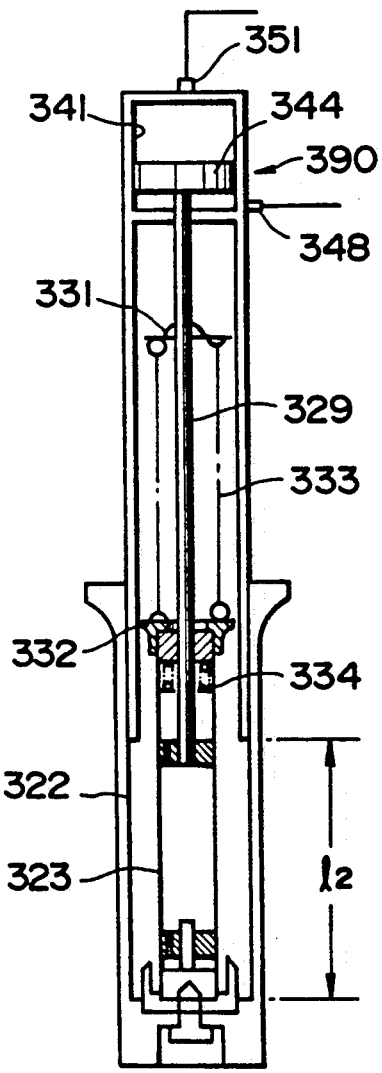

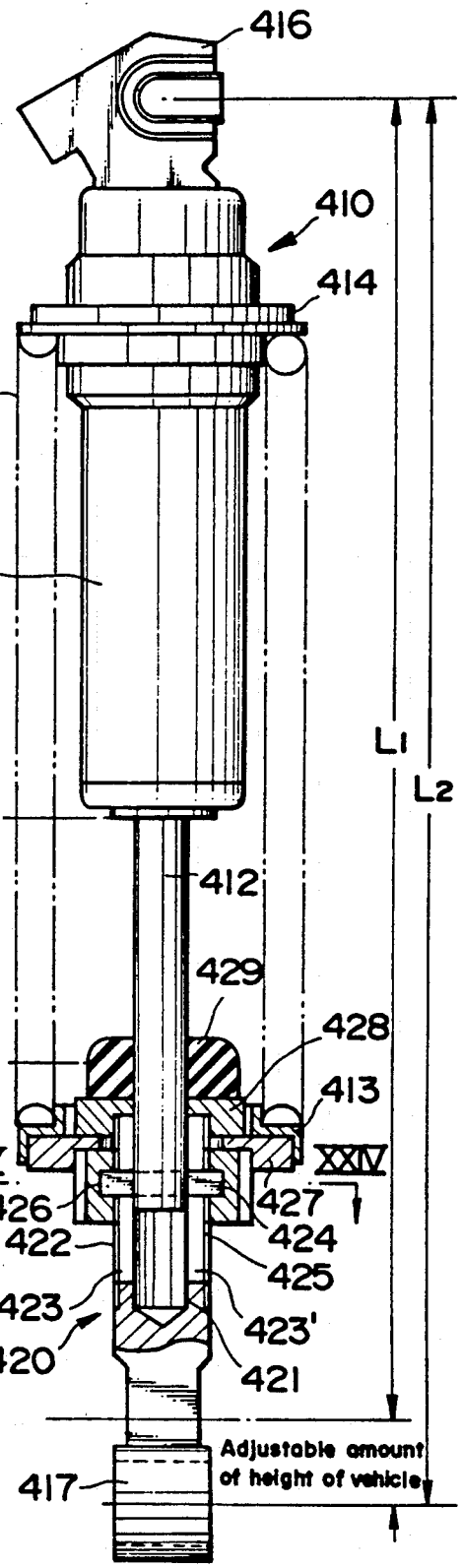
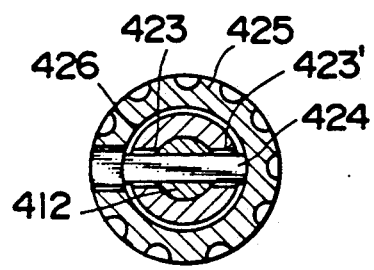
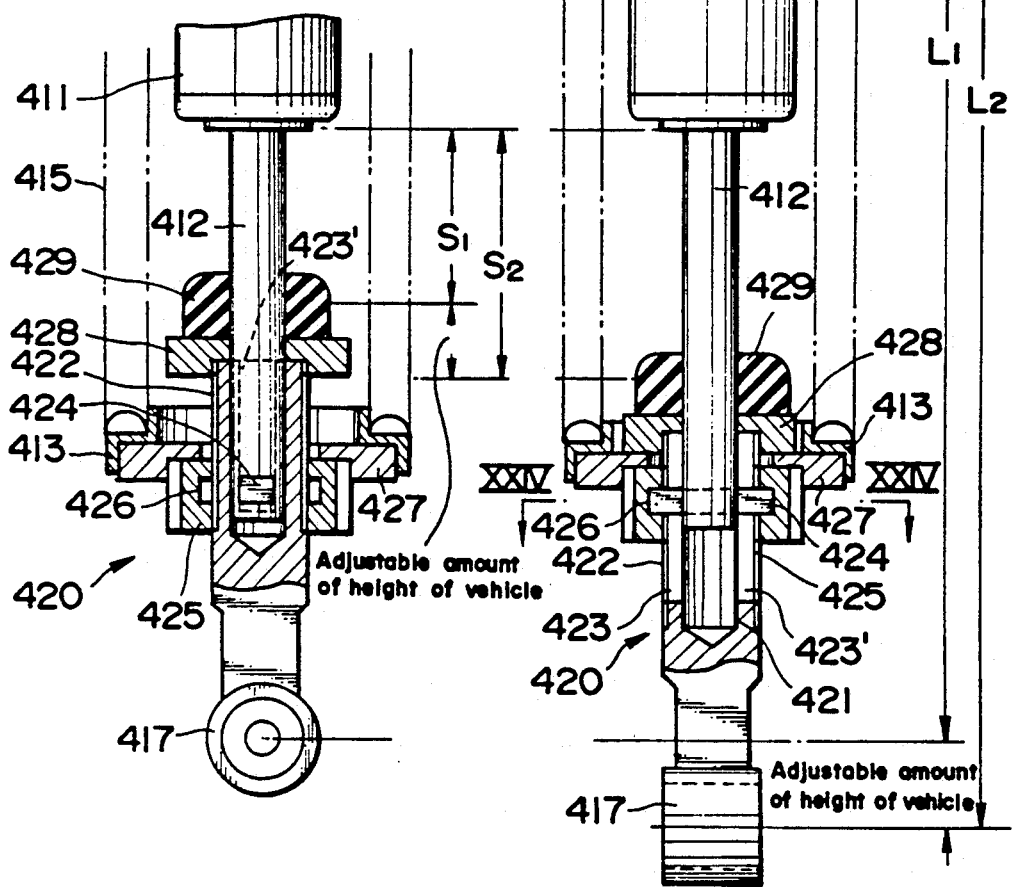

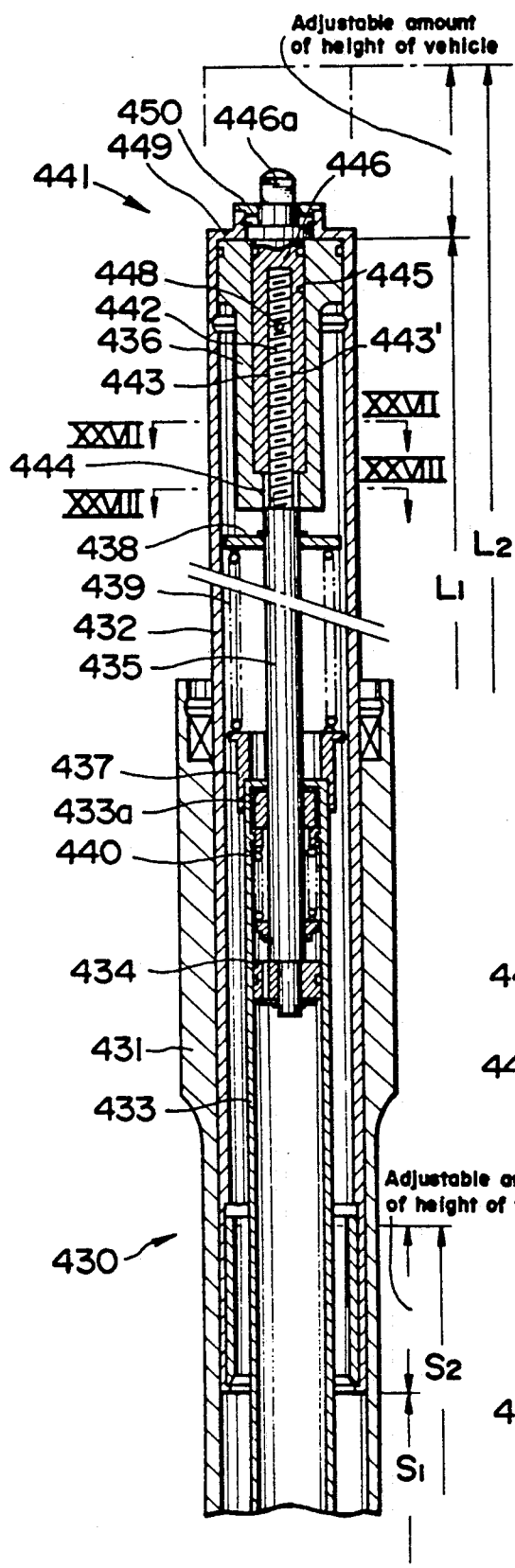
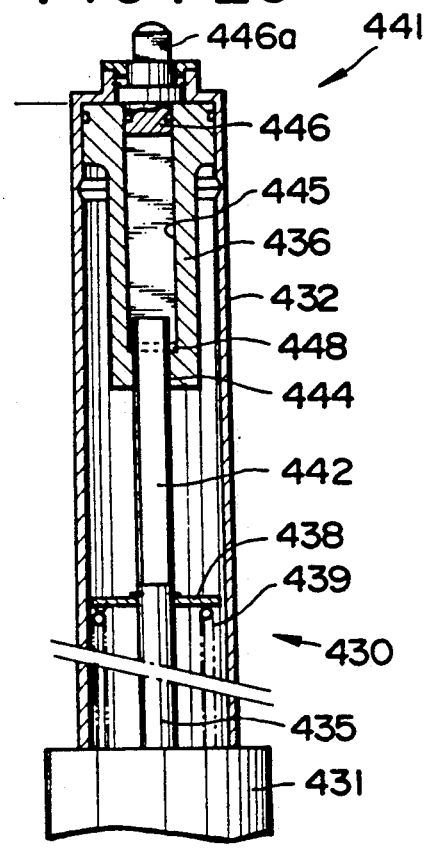
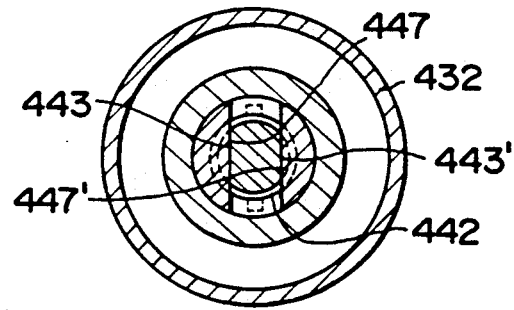
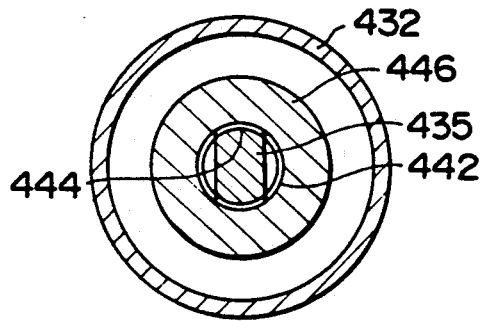

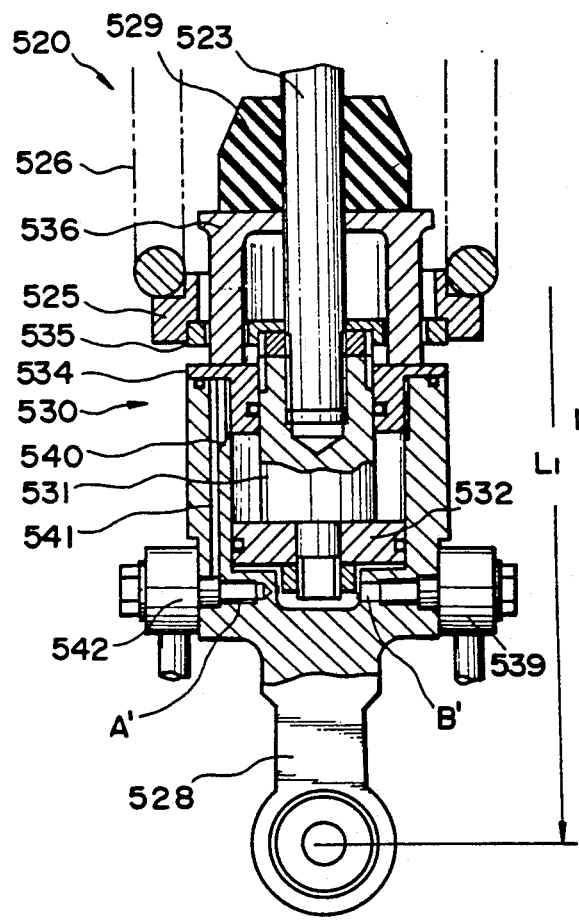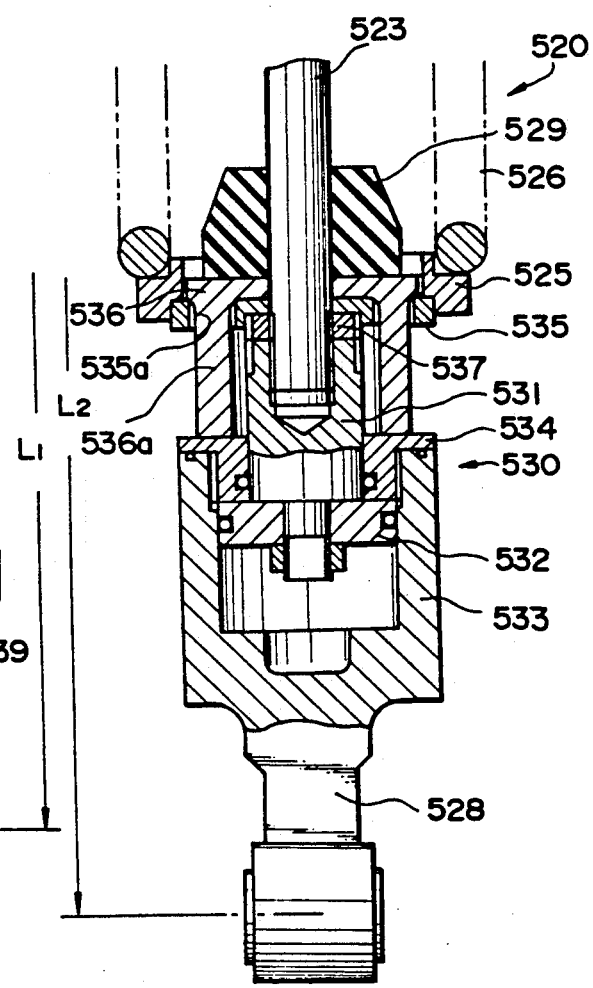

SHOCK ABSORBER FOR USE IN A VEHICLE

FIELD OF THE INVENTION

The present invention relates to a shock absorber for use in a vehicle for cushioning a vibration caused between a vehicle body and an axle, in which a suspension spring is disposed between one member which may serve as a mass positioned above the spring of the shock abosorber and the other member which may also serve as a mass positioned below the same.

BACKGROUND OF THE INVENTION

In the latest automatic two-wheeled vehicle, an apparatus for adjusting a height of the vehicle has often been provided so that rider's feet cannot only reach the ground to stop the vehicle when running on the urban area but also a performance of the vehicle as covering a wasteland may be improved. There have conventionally been two kinds of a rear cushion type apparatus: one is a type in which an initially set load can be changed and the other to a type in which its entire length can be changed.

A rear cushion having an apparatus for adjusting the height of vehicle, in which the initially set load can be changed, is known from, for example, U.S. Pat. No. 4,159,105. Its schematic views are shown in FIGS. 10 to 12, in which reference numeral is a damper cylinder, 2 a piston, 3 a piston rod, 4 a suspension spring, 5 a rebound spring, 6 a stopper rubber, 7 a member for mounting the piston rod 3, around which a cylinder 11 for adjusting the height of vehicle is formed as one member for adjusting the height of vehicle. 8 is a mounting member used for either one of the vehicle body and axle, 9 the other remaining mounting member used for the vehicle body or axle, 10 a piston for adjusting the height of vehicle, which is arranged as the other member for adjusting the same, the piston vertically sliding within the above-mentioned adjusting cylinder, with one end of the suspension spring supported thereagainst. FIG. 10 relates to a state in which the suspension spring 4 is set to be slightly compressed in an initially loaded state, i. e., when the piston rod 3 is withdrawn to maximum extent out of the cylinder until the rebound spring 5 is completely compressed, the state being one in which the shock absorber is extended to maximum extent. FIG. 11 illustates a state in which since a rider rides on the vehicle the suspension spring 4 is compressed from a position of FIG. 10 and a mounting length is shortened and yet the height of vehicle is not adjusted yet, the state being suitable for running on the urban area because his feet can reach the ground. FIG. 12 illustrates a state in which when the rider rides on the vehicle and runs into a wasteland a hydraulic oil is supplied into the cylinder for adjusting the height of vehicle formed about the member 7 for mounting the piston rod to outwardly displace the member 7 with the result that the height of vehicle is increased from $L_1$ to $L_2$. $l_t$ is a total stroke, $l_1$ a compession stroke, and $l_2$ a rebound stroke. (Actually, although the stroke $l_t$ equals a value obtained by deducting a compressed length of the rebound spring and the basic lengthes assumed by, for example, an oil seal and rod guide and the like at the end of a bore of the cylinder, in this case, it is represented as such including them for convenience of description. Unless otherwise specified, the same applies to the following part of this specification.)

If a displacement vs. load curve of the suspension spring is graphically plotted in which an initial load is set, then $K_1$ is obtained as in FIG. 13. $I_1$ is the value of the initial load If the initiallly set load is varied from $I_1$ to $I_2$, then the displacement vs. load curve is plotted as $K_2$. If the piston 10 for adjusting the height of vehicle is now upwardly displaced from a position of the lower end within the cylinder of FIG. 11 to increase the initially set load of the suspension spring, then, since the load applied to the suspension spring is the same as before adjusting the height of vehicle, the piston rod is withdrawn by that displacement of the piston 10 from a damper cylinder 1 to increase the height. Consequently, the rider will feel rather stiff to ride on the vehicle because the initiallly set load of the suspension spring is increased. Besides, since the total stroke $l_t$ of the hydraulic shock absorber remains the same before (FIG. 11) and after (FIG. 12) the height is increased, even if he increases the height of vehicle after he runs into the wasteland, a great shock cannot be absorbed. Further, although the total stroke $l_t$ remains the same before and after the height is increased the position of the piston in an unloaded state is changed and the distributions of stroke at the compression and extension sides become different with each other. As a result, they respectively assume a relationship of the strokes: compression side stroke $l_1'$ and the rebound stroke $l_2'$, and when the height of vehicle is increased, then the rebound stroke is shortened, which causes a frequency at which the piston strikes against the rebound spring to be increased with the result that a proper cushioning performance cannot be achieved.

Further, another hydraulic shock absorber having a height adjusting apparatus of a type in which a full length may be changed is known from. for example, Japanese Patent Laid-open 79776/1980. Its schematic views are shown in FIGS. 14 and 15. 21 is a damper cylinder, 22 a piston, 23 a piston rod, 24 a suspension spring, 25 a rebound spring, 26 a rubber stop, 27 a spring bearing rigidly fixed along the outer periphery of the piston rod, 28 a mounting member for either side of the body and axle of a two-wheeled vehicle, 29 a mounting member for the other side of the body or axle, 30 a piston for adjusting the height of vehicle serving as one member for adjusting the same, which is fixed to the upper end of the piston rod, 31 a cylinder for adjusting the height of vehicle, which is arranged as the other member for adjusting the same and 32 a spring bearing fixed to the outer periphery of the cylinder. When, in a state prior to increase of the height of vehicle, in which a rider rides, as shown in FIG. 14, a hydraulic oil is supplied to the upper port of the cylinder 31, assuming for ease of understanding that the piston rod 23, hence, the piston 30 stands still and only the cylinder 31 is elevated, the height of vehicle is increased as shown in FIG. 15, so that the mounting length is increased from $L_1$ to $L_2$. As a result, since the initially set load of the suspension spring remains the same, when the height of the vehicle is increased, the rider can experience the same feeling as when he runs on the flat urban area, but since the total stroke $l_t$ remains the same, a possible major thrust from below, which can often be experienced during running on the wasteland, cannot be absorbed, as in the case of the above-described shock absorber in which the initially set load can be changed. Besides, since the mounting length is made longer by a stroke of the piston 30 as the shock absorber is compressed to maximum extent after the height of vehicle is increased, a large space becomes necessary between the body of vehicle and the axle.

Also, in the conventional apparatus for adjusting the height of vehicle for use in a front fork of the two-wheeled vehicle, there are two types: a type in which the initially set load can be changed and a type in which the entire length can be changed.

The front fork of a type in which the initially set load may be changed is known from, for example, Japanese Utility Model Laid open 160890/1983, which is illustrated in FIGS. 16 to 18. In the same figures, 41 denotes an inner barrel, 42 an outer barrel, 43 a sheet pipe, 44 a suspension spring, 45 a rebound spring, 46 a piston for adjusting the height of vehicle and 47 a cylinder for adjusting the height of vehicle. FIG. 16 shows a state in which an initially set load is set, i. e., a state in which the suspension spring 45 is slightly compressed with the height of vehicle not adjusted as the inner barrel is withdrawn to maximum extent and the rebound spring 45 is completely compressed. FIG. 17 shows a state in which when a rider rides on a two-wheeled vehicle having a front fork of FIG. 16 and the suspension spring is compressed the height of vehicle is not adjusted, which is suitable for running on a flat urban area. FIG. 18 shows a state in which as a rider rides on a two-wheeled vehicle and runs on a wasteland a hydraulic oil is supplied to a cylinder 47 for adjusting the height of vehicle formed at a fork bolt 48 of an inner barrel 41 to displace the inner barrel 41 with respect to an outer barrel 42 with the result that the height of vehicle is increased from $L_1$ to $L_2$. $l_t$ is a total stroke. Actually, its value becomes equal to a value obtained by deducting a basic lengh assumed by, for example, an oil lock collar at the tip end of the inner barrel and the compressed lengthes of the rebound spring and the like. However, in this embodiment, it is generally represented as $l_t$ for convenience of discription. Unless otherwise specified, the same also applies to the following part of specification.

If a displacement vs. load curve of the suspension spring is graphically potted as the initial load of FIG. 16 is set, then $K_1$ is obtained as seen in FIG. 19. $I_1$ is the value of the initially set load. If the initially set load is changed from $I_1$ to $I_2$, then the displacement vs. load curve of the suspension spring is shifted to $K_2$. Now let us assume that in order to increase the height of the vehicle the piston 46 of FIG. 17 is downwardly displaced from the upper end position within the cylinder 47 to increase the initial load imposed on the suspension spring 44, then, since the load imposed thereon is the same as before adjusting the height of vehicle, the inner barrel is withdrawn by a displacement of the piston 46 from the outer barre with the result that the height of the vehicle is increased. In consequence, the rider can feel rather stiff to ride on the vehicle by such an increased initial load of the suspension spring.

Besides, since the total strokes $l_t$ of the hydraulic shock absorber are the same before(FIG. 17) and after (FIG. 18) the height of vehicle is increased, even if he runs into the wasteland and accordingly increases the height of vehicle, it cannot absorb large shocks. In addition, although the total strokes $l_t$ remain the same before and after the height of vehicle is increased, the position of the stroke of the piston in the condition of an unloaded state is altered, so that the distributions of the stroke become different at the compression and extension sides, and when the height of vehicle is increased as in FIG. 18, then the rebound stroke $l_2'$ is shortened, which causes a frequency at which the piston strikes against the rebound spring to be increased with the result that a proper cushioning performance cannot be achieved.

Further, a front fork provided with an apparatus for adjusting the height of vehicle of a type in which the entire length can be changed is known from, for example, Japanese Patent Publication 23036/1988. Its schematic views are shown in FIGS. 20 and 21. In this embodiment, a screw rod 57 is screwed into a cap 56 at the upper end of an inner barrel 51, this screw rod being rotatably mounted to a sliding pipe 58 which may slidably fit with the outer circumference of the inner barrel 51 by means of a handle 59. In a state of FIG. 20, prior to increase of the height of vehicle, in which a rider rides and runs into the wasteland, for ease of understanding, let us assume that the inner barrel 51 stands still, a handle 59 is turned so that the sliding pipe 58 may upwardly be moved. At this time, the mounting length of the front fork is increased from $L_1$ to $L_2$ as the suspension spring is compressed to maximum extent. At this time, since the initially set load of the suspension spring 54 remains the same, the rider can experience the same feeling as when the height of vehicle is increased as when he runs on the flat urban area, but since the total stroke $l_t$ remains the same, a large thrust from below cannot be absorbed when he runs on the wasteland as in the above-described type in which the initially set load can be changed. In addition, since the mounting length of the front fork, which is compressed to maximum extension after the height of the vehicle is increased, becomes larger by a stroke of the sliding pipe 58 than before the height of vehicle is increased, a large space can become necessary between the vehicle body and the tire.

Accordingly, it is a principal object of the present invention to provide a novel shock absorber for use in a vehicle in which drawbacks inherent to the above-described two types are eliminated, i.e., the initially set load is also not changed a the height of vehicle is increased and the total stroke is made longer while at the same time the rebound stroke remains the same and yet the mounting length of the absorber assumed as compressed to maximum extent also remains the same.

Another object of the present invention is to provide a novel shock absorber having an apparatus for manually adjusting the height of vehicle for use in a vehicle, in which the initially set load of the suspension spring is not changed as the height of vehicle is increased while at the same time the stroke of piston is made longer and yet the mounting length of the shock absorber assumed as compressed to maximum extent is not also changed.

A further object of the present invention is to provide an inexpensive shock absorber having a hydraulic drive source for driving an apparatus for adjusting the height of vehicle for use in a vehicle, in which the initially set load of the suspension spring is not changed a the height of vehicle is increased while at the same time the stroke of piston is made longer and yet the mounting length of the shock absorber assumed as compressed to maximum extent is not also changed, said apparatus using a combination of a pressure tank and a check valve in place of an electromotive hydraulic pump.

SUMMARY OF THE INVENTION

According to an essential aspect of the present invention, the shock absorber of the invention for use in a vehicle has an apparatus for adjusting the height of vehicle which permits the mounting length of the shock absorber to be adjusted without changing an initially set load of a suspension spring, the apparatus being relatively displaced with respect to one member so that the stroke of the shock absorber may be changed.

In the apparatus for adjusting the height of vehicle according to the present invention, since the mounting length of the shock absorber can be adjusted without changing the initially set load of the suspension spring, when the height of the vehicle is increased as a rider runs on the wasteland, he can enjoy the same comfortable feeling as when he runs on a flat urban area. In addition, since the apparatus is so arranged that the stroke of the shock absorber may relatively be changed with respect to one member which serves as a mass positioned above a spring, a major thrust from below can be absorbed when he runs on the wasteland while at the same time there is no chance that the piston strikes against the rebound spring as is the case with the apparatus of a type in which the initially set load is variable because the amount of a rebound stroke of the piston is not also changed, which exerts no adverse effect upon a damping characteristic after it is extended. In addtion, since the mounting length of the shock absorber is not changed when compressed to maximum extent, the vehicle body, clearance and the like may be similarly designed as in the conventional shock absorber, calling for no extra space which can be caused by the increased height of the vehicle.

Further, according to one specific embodiment of the shock absorber, the above-described apparatus has one member for adjusting the height of vehicle which may serve as a mass at one side of the shock absorber, and the other member for adjusting the same, which is disposed so as to be relatively displaced with respect to the above-described member while comprising one spring bearing displacably disposed with respect to the above-mentioned other member, the one spring bearing being connected to the one member which may serve as the mass at one side of the shock absorber, the other spring bearing fixed to the member which may serve as the other mass of the shock absorber and a suspension spring being disposed between both the spring bearings. This arrangement is especially suitable for a rear cushon of a two-wheeled vehicle and a shock absorber of a four-wheeled vehicle and the like.

In another embodiment of the present invention, the apparatus for adjusting the height of vehicle comprises one member for adjustiung the height of vehicle which may serve as a mass at one side of the shock absorber and the other member for adjusting the same, which is disposed so as to be relatively displaced with respect to the above-mentioned member while comprising one spring bearing fixed to the above-described other member for adjusting the height of vehicle, the other spring bearing disposed so as to be relatively displaced with respect to the member which may serve as the other mass at the other side of the shock absorber and a suspension spring disposed between the above-described spring bearings. This arrangement includes a suspension spring the initially set load of which may be changed within the apparatus of the rear cushion for adjusting the height of vehicle. The one spring bearing, which is fixed to the other member for adjusting the height of vehicle, may be displaced therewith while the other spring bearing is disposed so as to be relatively displaced with respect to the member of the shock absorber which may serve as a mass positioned above the spring. Therefore, before and after the height of the vehicle is increased, the other spring bearing is relatively displaced with respect to the other member of the shock absorber, which may serve as a mass, so that the initial load of the suspension spring may variously be set.

Further, in another embodiment of the present invention, the shock absorber has an outer barrel connected to either side of axle and vehicle body, an inner barrel slidably fitted within this outer barrel, the inner barrel being connected to either side of the vehicle body and axle, and a damper cylinder fixed within the outer barrel, and the above-described apparatus for adjusting the height of vehicle is arranged by displacably fixing the other end of a piston rod within the inner barrel, which may slide within the damper cylinder by the action of a piston at the tip end thereof to thereby generate a damping force, a suspension spring being disposed between one spring bearing fixed to the piston rod and the other spring bearing fixed to the above-mentioned spring bearing. This arrangement is especially suitable for a front fork of the two-wheeled vehicle.

According to the other aspect of the present invention, the shock absorber having a member mounted at the side of axle or vehicle body, which may be relatively displaced with respect to the piston rod and one spring bearing connected thereto, has a following apparatus for manually adjusting the height of the vehicle. Namely, a hollow portion having an inner periphery along which the piston rod may slide is provided within the member mounted at the side of the above-described axle or vehicle body and a threaded portion is formed along the outer periphery thereof while an elongated hole pierced through from the outer periphery up to the hollow portion is formed in the axial direction and a member for connecting the spring bearing is provided which radially protrudes from the piston rod so as to slide within the axial elongated hole of the above-described member. An adjuster for adjusting the height of vehicle is fitted through the above-mentioned threaded portion formed on the outer periphery of the member mounted to the side of the axle or vehicle body while a recessed portion engaged with the spring bearing connecting member is formed at the adjuster protruding from the elongated hole.

According to this apparatus for manually adjusting the height of the vehicle, which is especially suitable for a rear cushion, since the entire height of the vehicle and the stroke can be changed corresponding to the adjusted height of the vehicle without changing the length assumed as compressed to maximum extent and the initially set load of the suspension spring, when he increases the height of vehicle during running on the wasteland, the same comfortable feeling can be assured to the rider as when he runs on the flat urban area while a major thrust from below, which is often experienced as he runs on the wasteland, can be absorbed. In addition, since the height of vehicle can be adjusted by means of a screw, an reliable adjustment can be assured while it can be fixed to any arbitrary adjusted position. Still more, it is light and compact, and can be manufactured at a low cost.

Besides, the front fork made according to the present invention, which is arranged so that the member mounted at the side of axle or vehicle body may relatively be displaced with respect to the piston rod and the spring bearing connected thereto, has a following apparatus for manually adjusting the height of vehicle.

Namely, a threaded portion and an engaging portion are formed on the outer periphery of the upper portion of the piston rod and a cover member at the end portion of the inner or outer barrel is fitted into the threaded portion while an adjuster for adjusting the height of vehicle, which engages the engaging portion of the piston rod to transmit a rotational force while allowing for a relative displacement in the axial direction, is rotatably fitted to the above-mentioned cover member.

According to another aspect of the invention, the shock absorber for use in a vehicle has a following hydraulic apparatus for adjusting the height of vehicle. Namely, the apparatus comprises a member mounted at the side of axle or vehicle body, which may be relatively displaced with respect to a piston rod of the shock absorber and a spring bearing connected thereto via a means for transmitting a hydraulic pressure, while comprising a cylinder for adjusting the height of vehicle, which has one and the other oil chambers partitioned by the piston for adjusting the height of vehicle, a tank having therein a gas chamber and an oil chamber partitioned by a partitioning member and, a check valve disposed within a line line which communicates the oil chamber within this tank with one oil chamber of the cylinder and a check valve disposed within a line communicating the oil chamber within the tank with the other oil chamber, both check valves being disposed in directions inhibitting a reverse flow from the oil chamber within the cylinder, the check valves each having a relief means.

In this arrangement, since there is provided the member mounted at the side of axle or vehicle body which may be relatively displaced with respect to the piston rod and the spring bearing connected thereto via the means for transmitting a hydraulic pressure, the height of vehicle and the stroke can correspondingly be changed by the same displacement without changing the initially set load of the suspension spring and its mounting length assumed as compressed to maximum extent. Further, in this gas-filled hydraulic apparatus for adjusting the height of vehicle, a combination of the check valves and a gas-filled oil tank is substituted for an electromotive hydraulic pump to obtain an inexpensive hydraulic drive source for the cylinder. Still more, it is highly operable and can be fixed at any arbitrary position where the height of vehicle is adjusted. Furthermore, since the check valves are disposed in directions inhibiting a reverse flow of oil from the oil chamber within the cylinder, the fluctuation of pressure caused by a vibration of the vehicle cannot be transmitted to the tank.

In addition, it is preferable that the shock absorber according to the present invention has a following hydraulic apparatus for adjusting the height of vehicle. Namely, a piston for adjusting the height of vehicle is mounted to the piston rod which may displacably be fitted into the cylinder for adjusting the height of vehicle formed at the member mounted at the side of axle or vehicle body, via a means for transmitting a hydraulic pressure, and a member for engaging this piston rod to the spring bearing at the side of the piston rod is disposed upwardly of the member mounted at the side of axle or vehicle body.

In this cylinder, since a connecting member for connecting the piston rod to the spring bearing is disposed upwardly of the member mounted at the side of axle or vehicle body, it is advantageous from the viewpoint of strength as compared with the manually-operated hydraulic rear cushion, in which because the connecting member is disposed upwardly of the cylinder an opening becomes necessary for the member at the side of axle or vehicle body to be axially displaced, which can in turn weaken the strength of the mounting member.

BRIEF DESCRIPTION OF THE DRAWINGS

FIG. 2 is a schematic view illustrating a state in which prior to increase of the height of vehicle a rider rides on a two-wheeled vehicle having a rear cushion of FIG. 1, so that the suspension spring is compressed;

FIG. 3 is a schematic view illustrating a condition of the rear cushion of FIG. 2 after the height of vehicle is increased;

FIG. 5 is a schematic view illustrating a state in which prior to increase of the height of vehicle a rider rides on a two-wheeled vehicle having a rear cushion of FIG. 4, so that the suspension spring is compressed;

FIG. 6 is a schematic view illustrating a state of a rear cushion of FIG. 5 after the height of vehicle is increased;

FIG. 8 is a schematic view illustrating a state in which a rider rides on a two-wheeled vehicle having a front fork of FIG. 7 without the height of vehicle being adjusted, so that the suspension spring is compressed;

FIG. 9 is a schematic view illustrating a state of a front fork of FIG. 8 after the height of vehicle is increased;

FIG. 22 is a longitudinal view in partial cross section illustrating a state of a rear cushion prior to increase of the height of vehicle, having an apparatus for adjusting the height of vehicle according to the present invention;

FIG. 23 is a longitudinal view in cross section illustrating a state of the rear cushion of FIG. 22 after the height of vehicle is adjusted;

FIG. 24 is a lateral view in cross section taken along line XXIV—XXIV of FIG. 23;

FIG. 25 is a longitudinal view of a front fork prior to adjustment of the height of vehicle, having an apparatus for adjusting the height of vehicle according to the present invention ;

FIG. 26 is a longitudinal view in cross section illustrating a state of the front fork of FIG. 25 after the height of vehicle is adjusted;

FIG. 27 is a lateral view in cross section taken along line XXVII—XXVII FIG. 25;

FIG. 28 is a lateral view in cross section taken along line XXVIII—XXVIII of FIG. 25;

FIG. 29 is a partial cross-sectional view of a rear cushion of a two-wheeled vehicle prior to adjustment of the height of vehicle having an apparatus for adjusting the height of vehicle according to the invention;

FIG. 30 is a partial cross-sectional view illustrating a state of the rear cushion of FIG. 29 after the height of vehicle is increased;

DETAILED DESCRIPTION OF THE PREFERRED EMBODIMENTS

The present invention is now hereinafter described in greater detail with specific reference to preferred embodiments in conjunction with the accompanying drawings.

Figure 1:
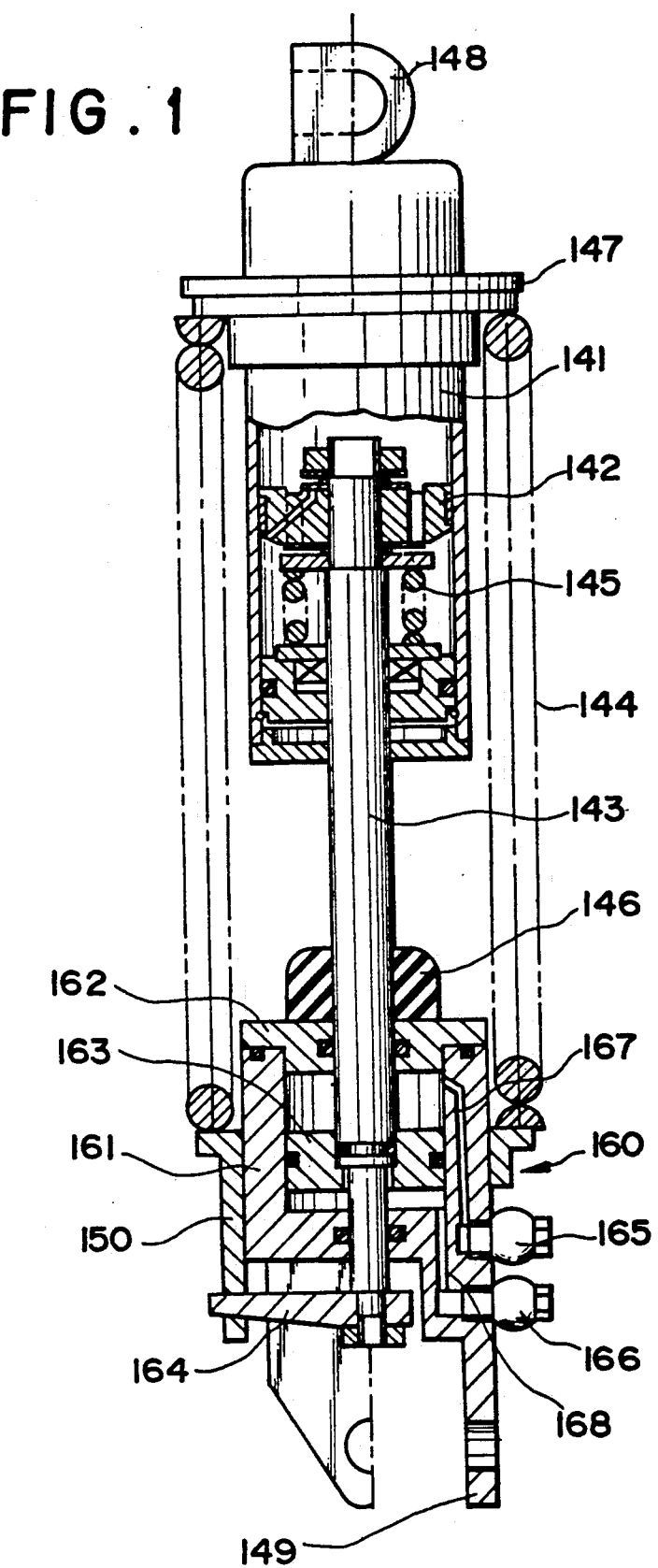
FIG. 1 is a longitudinal view, in partial cross-section, of a rear cushion for use in an automatic two-wheeled vehicle, which is provided with an apparatus for adjusting the height of vehicle according to a first embodiment of the present invention.

FIG. 1 shows a rear cushion, in partial cross section, for use in an automatic two-wheeled vehicle having an apparatus for adjusting the height of vehicle according to a first embodiment of the present invention.

A piston 142 is slidably fitted at the tip end portion of a piston rod 143 which passes through the bottom portion of a damper cylinder 141 so that it may slide within the cylinder 141. A means for generating a damping force at the extending side and a means for generating a damping force at the compression side are respectively attached, as usual, to the upper and lower surfaces of the piston 142. Reference numeral 145 is a rebound first spring and 146 a damper rubber. A suspension spring 144 is fitted between a spring bearing 147 screwed into the damper second cylinder 141 and a cylindrical spring bearing 150 slidably fitted around an apparatus 160 for adjusting the height of vehicle which will be described later. In this case, the masses existing above the spring are the spring bearing 147 and the damper cylinder 141 while those existing below the spring are the piston 142, piston rod 143, apparatus 160, spring stopper 164 and the spring bearing 150. A first mounting member 148 is provided at the top of the shock absorber for mounting to a body part of the vehicle.

The apparatus for adjusting the height of vehicle according to the present invention has a spring bearing 150 slidably fitted about the outer periphery of a second cylinder 161 for adjusting the height of vehicle, which is arranged as the other mmeber for adjusting the height of vehicle and a second mounting member 149 at the side of the axle is integrally formed at the lower end of the cylinder 161 for adjusting the height of vehicle. The piston rod 143 passes through a cap 162 fixed at the upper end of the cylinder 161 and the lower end of the cylinder 161 and a second piston 163 for adjusting the height of vehicle attached to the piston rod 143 is slidably fitted within the cylinder 161. The spring stop 164 is fixed to the tip end of the piston rod downwardly protruding from the cylinder 161 to engage the spring bearing 150. Ports 165 and 166 provided through the periperal surface of the cylinder 161 each communicating with the upper and lower chambers of the piston 163 via passageways 167 and 168.

The operation of the apparatus of a rear cushion thus arranged is now described with reference to FIGS. 2 and 3. FIG. 2 shows a state of the rear cushion as the suspension spring 144 is compressed under the action of the weight of a rider who rides on an automatic two-wheeled vehicle, which state assures that his feet can easily reach the ground to stop the vehicle and is suitable for running on a flat urban area. This state is one prior to adjustment of the height of vehicle, in which a pressurized oil is supplied from the port 165 into the upper chamber of the cylinder 161. At this time, the total stroke $l_t$ covers from the lower surface of the piston 142 of the damper cylinder 141 up to the upper surface of the stopper rubber 146 as yielded to its maximum extent.

When the rider runs into the wasteland, the pressurized oil is supplied from the port 166 below the cylinder 161 into the cylinder 161 while being discharged from the upper port 165. In this case, assuming for ease of understanding that the piston rod 143 stands still, only the cylinder 161 is downwardly slided within the spring bearing 150 until the mounting length is increased from $L_1$ into $L_2$ to increase the height of vehicle. At this time, since the spring bearing 150 also stands still, the suspension spring 144 remains not to be displaced and its initially set load does not change. In addition, since the piston rod also retain a still condition and only the cylinder is downwardly-displaced with respect to the piston rod, the stroke $l_t'$ of the shock absorber is increased. Further, since the position of the piston in an unloaded condition within the damper cylinder 141 remains the same, a magnitude of the rebound stroke within the damper cylinder also remains the same. The mounting length of the rear cushion is increased by the amount of stroke of the cylinder, as can readily been understood from FIGS. 2 and 3.

Figure 4:
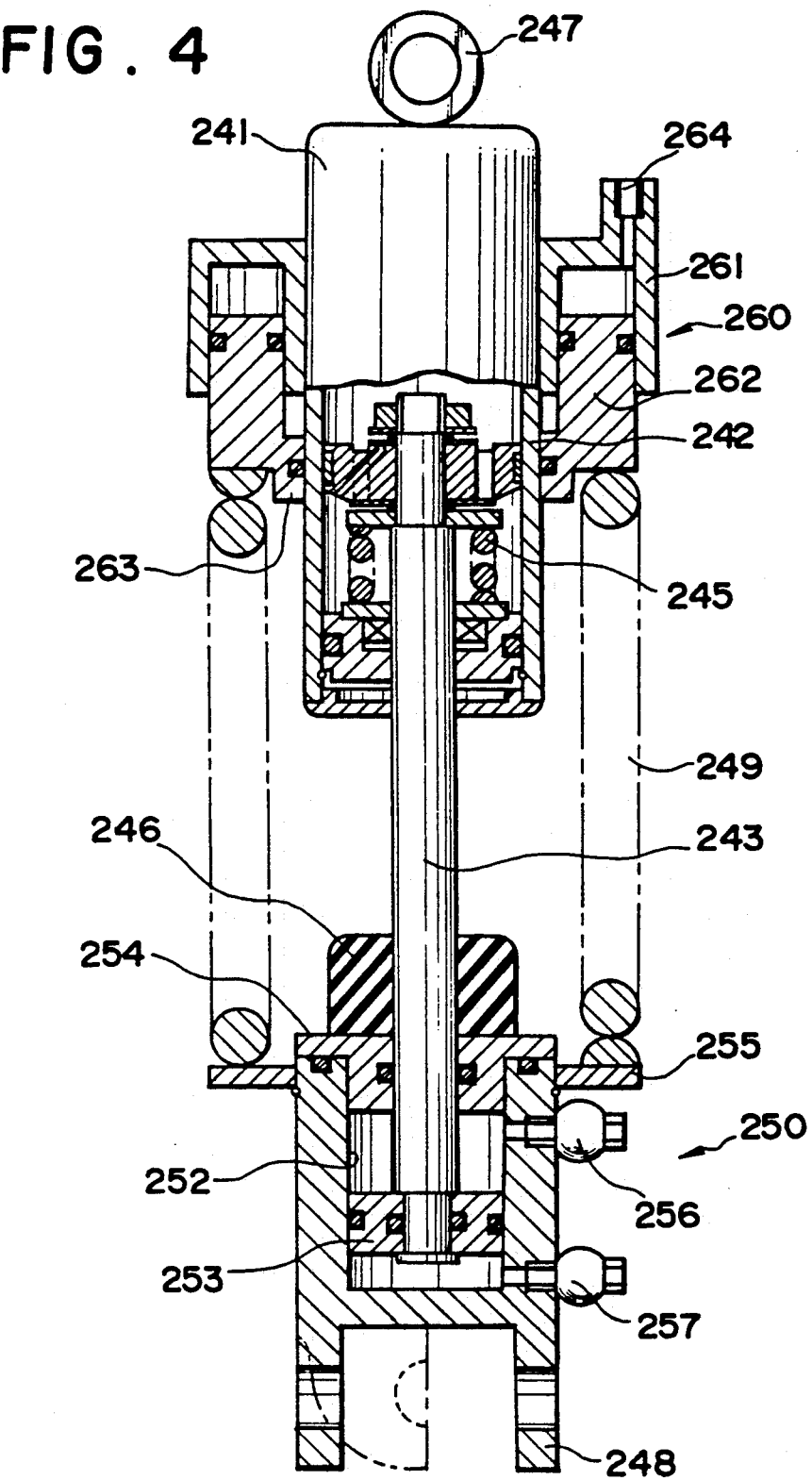
FIG. 4 is a longitudinal view in partial cross section, of a rear cushion for use in an automatic two-wheeled vehicle, which is priovided with an apparatus for adjusting the height of vehicle according to a second embodiment of the present invention.

Next, a second embodiment of the present invention is described in greater detail with reference to the accompanying drawings, in which FIG. 4 illustrates a rear cushion in partial cross section having an apparatus for adjusting the height of vehicle according to the present invention for use in an automatic two-wheeled. A piston 242 is fitted at the tip end of a piston rod 243 passing through the bottom portion of a damper cylinder 241 so as to be slided within the cylinder 241. A means for generating a damping force at the extention side and a means for generating a damping force at the compression side are respectively mounted, as usual, at the upper and lower surfaces of the piston 242. Reference numeral 245 is a rebound spring, 246 a damper rubber, 247 a mounting member at the side of the body of the vehicle and 248 a mounting member at the side of axle.

According to the present invention, a portion 250 for adjusting the height of vehicle is provided at the lower portion of this rear cushion while a portion 260 for adjusting the initial load of the suspension spring is provided at the upper portion thereof, the suspension spring 249 being suspended therebetween.

The portion 250 for adjusting the height of vehicle according to the present invention has a cylinder 252 for adjusting the height of vehicle which may serve as the other member for adjusting the height of vehicle, with which the mounting member 251 at the side of axle is integrally formed, so that a piston 253 for adjusting the height of vehicle, which may serve as one member for adjusting the height of vehicle, may be slided within the cylinder 252, the piston 253 being fixed to the tip end of the piston rod 243 downwardly extending within the cylinder through a cap 254 of the cylinder. At the outer periphery of this cylinder 252 is fixed one spring bearing 255 by means of a stop spring to support the lower end of the suspension spring. At the outer periphery of the cylinder 252 are attached a port 256 which may communicate with the upper chamber of the piston 253 and a port 257 which may communicate with the lower chamber of the piston 253.

In addition, the apparatus for adjusting the height of vehicle according to the present invention has a portion 260 for adjusting the initial load, which comprises a spring-adjusted annular cylinder 261 fixed to the outer periphery of the damper cylinder 241, and a spring-adjusted annular piston 262 which may be slided within that cylinder 261. A port 264 for supplying the pressurized oil is provided through the upper surface of the spring-adjusted cylinder 261. The spring-adjusted piston 262 has a guide portion 263 which may slide on the outer periphery of the damper cylinder 241. The spring-adjusted piston also serves as a spring bearing to support the suspension spring 249 at the lower end thereof.

Besides, a rear cushion having the apparatus for adjusting the height of vehicle according to the present invention has an advantage over one of the , for example, first embodiment, in which the upper end of the piston rod passing through the cylinder is connected to the spring bearing slidably fitted about the cylinder in that it can be shortened in entire length and be compact because the piston rod does not protrude from the cylinder therethrough.

The operation of the apparatus 250 and 260 of a rear cushion thus arranged is described with reference to FIGS. 5 and 6.

FIG. 5 is a state of a rear cushion according to the present invention as a rider rides on an automatic two-wheeled vehicle and the supension spring 249 is compressed, which is a state prior to adjustment of the height of vehicle, in which a pressurized oil is supplied from the port 256 into the upper chamber of the cylinder 252 for adjusting the height of vehicle, the state being suitable for running on the flat urban area because his feet can readily reach the ground.

At this time, the total stroke $l_t$ covers from the lower surface of the piston 242 of the damper cylinder 241 up to the upper surface of the stopper rubber 246 as compressed. When he runs into a wasteland in this state, a pressurized oil is supplied from the port below the cylinder 252 into the cylinder 252 while being discharged from the upper port 256 (FIG. 6). At this time, for ease of understanding, assuming that the piston rod 243 stands still, then only the cylinder 252 is downwardly moved with the result that the mounting length is changed from $L_1$ to $L_2$ to increase the height of vehicle. At this time, since the spring bearing 255 is fixed to the cylinder 252, the suspension spring 249 is made longer and its initially set load is changed. In order to correct this change, a pressurized oil of an amount corresponding to the displacement of the spring bearing at the side of axle is supplied from the port 264 of the portion 260 for adjusting the suspension spring to lower the piston 262 for adjusting the spring. Therefore, the initially set load of the suspension does not chage. Since the position of the piston in the unloaded state within the damper cylinder 241 is not changed, the rebound stroke $l_2$ within the damper cylinder is also not changed. Also, the mounting length of the rear cushion as compressed to maximum extent remains the same, as readily understood from FIGS. 5 and 6.

Incidentally, in the state of FIG. 5 (running on the urban area) and the state of FIG. 6 (running on the wasteland), a proper amount of oil is supplied to the port 264 at the portion 260 for adjusting the suspension spring, so that the initial load of the suspension spring may variously be set.

Next, a third embodiment of the present invention is described in detail with reference to the drawings.

Figure 7:
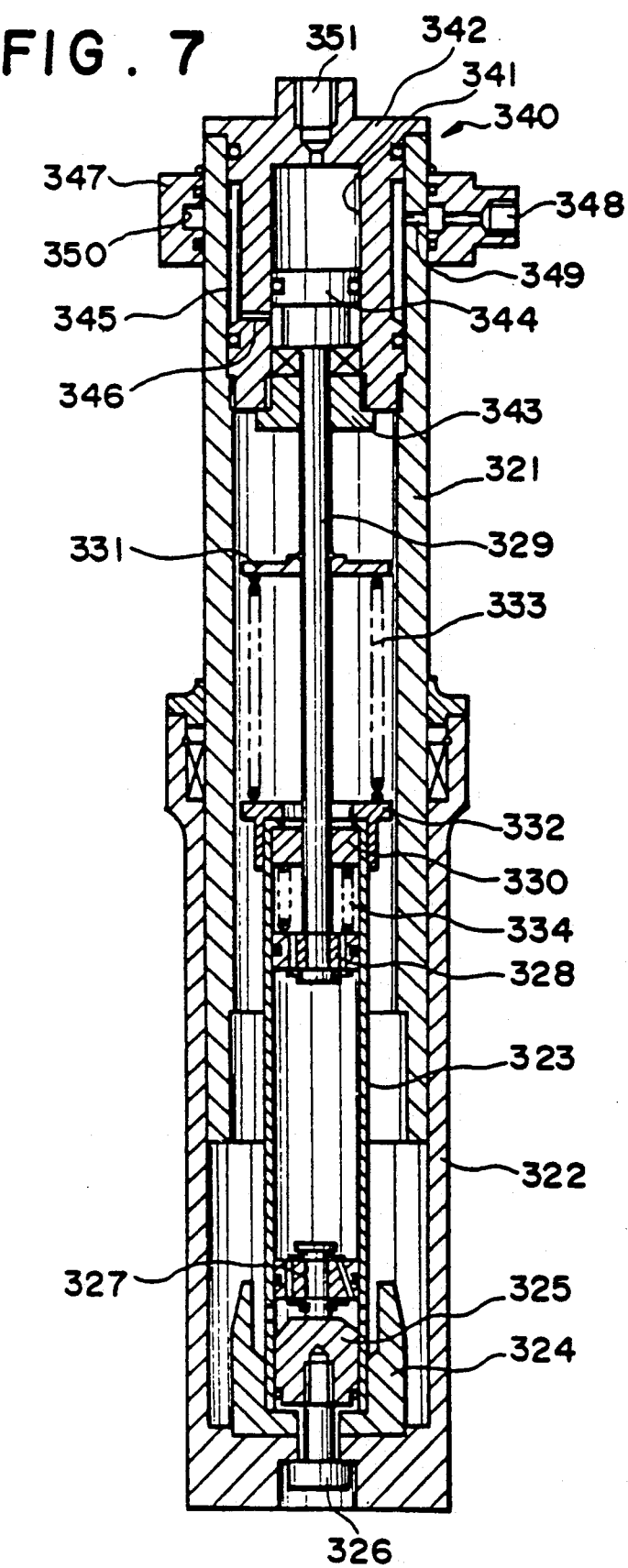
FIG. 7 is a longitudinal view, in cross section, of a front fork of a two-wheeled vehicle, which is provided with an apparatus for adjusting the height of vehicle according to a third embodiment of the present invention.
Figure 10:
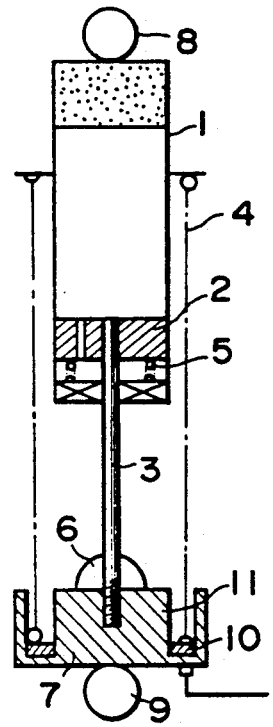
FIG. 10 is a schematic view illustrating a state of a rear cushion as the initial load is set, having a conventional apparatus for adjusting the height of vehicle the initially set load of which ma be changed.
Figure 11:
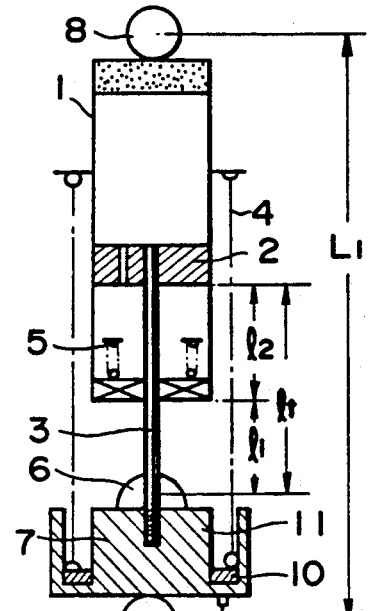
FIG. 11 is a schematic view illustrating a state in which a rider rides on a rear cushion of FIG. 10 before the height of vehicle is increased
Figure 12:
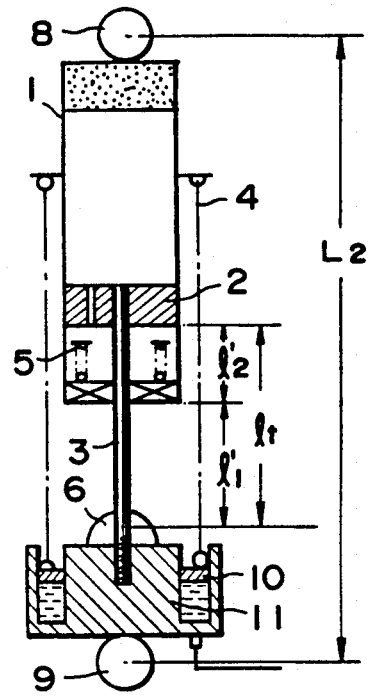
FIG. 12 is a schematic view illustrating a state of a rear cushion of FIG. 11 after the height of vehicle is increased.
Figure 13:
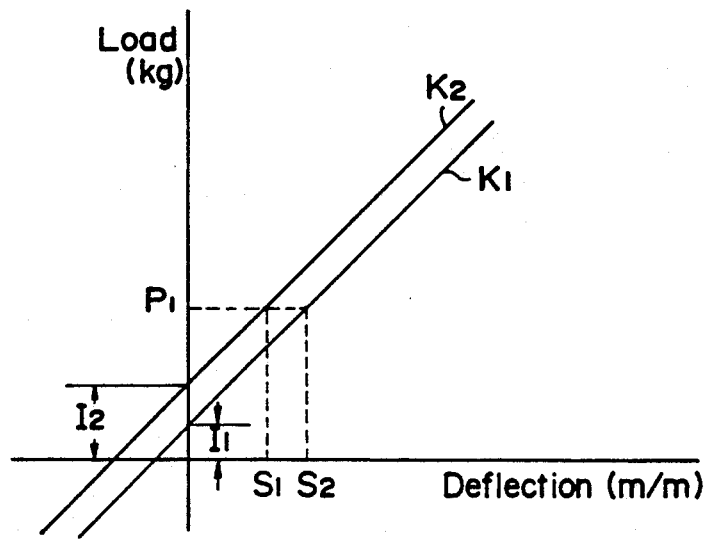
FIG. 13 is a graphic view illustrating a displacement vs load curve of the suspension spring of a rear cushion having an apparatus for adjusting the height of vehicle of a type in which the initially set load may be changed.
Figure 14:
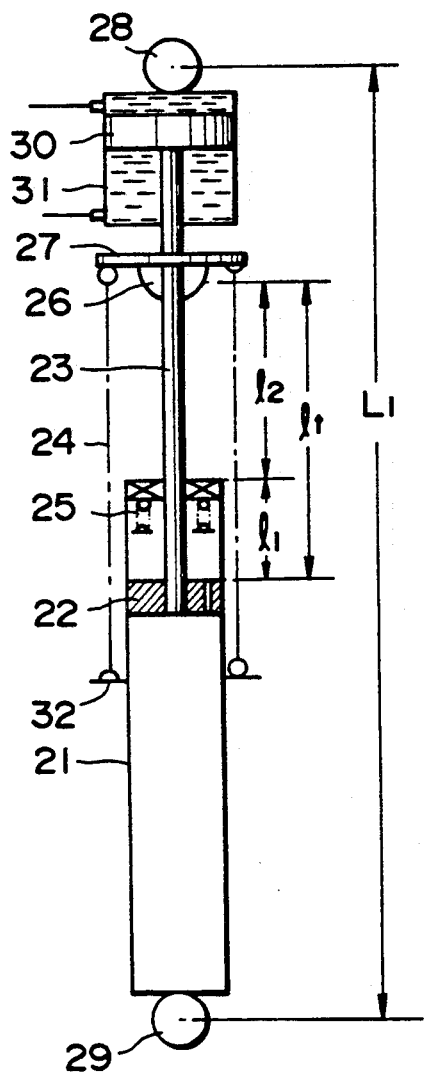
FIG. 14 is a schematic view illustrating a state prior to increase of the height of vehicle, in which a rider rides on a rear cushion having a conventional apparatus for adjusting the height of vehicle, in which the entire length can be changed.
Figure 15:
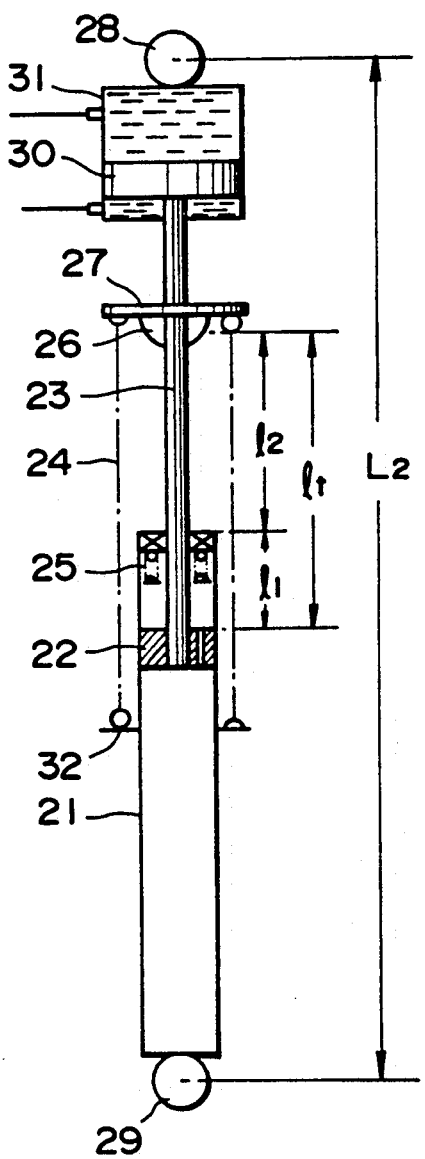
FIG. 15 is a schematic view illustrating a state of a rear cushion of FIG. 14 after the height of vehicle is increased.
Figure 16:
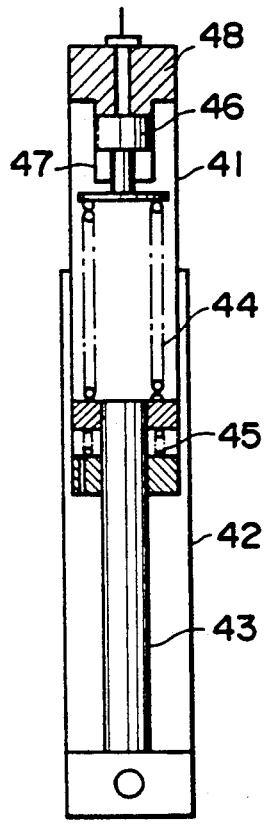
FIG. 16 is a schematic view illustrating a state of a conventional front fork of a type in which the initially set load may be changed as the initially set load is set.
Figure 17:
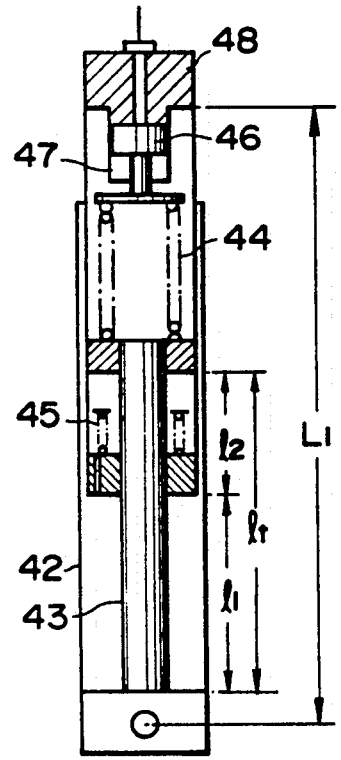
FIG. 17 is a schematic view illustrating a state before the height of vehicle is not adjusted, in which a rider rides on a two-wheeld vehicle having a front fork of FIG. 16, so that the suspension spring is compressed.
Figure 18:
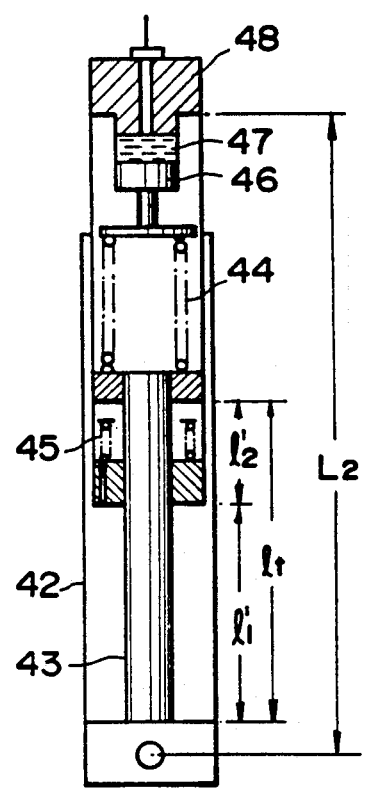
FIG. 18 is a schematic view illustating a state of the front fork of FIG. 17 after the height of vehicle is increased.
Figure 19:
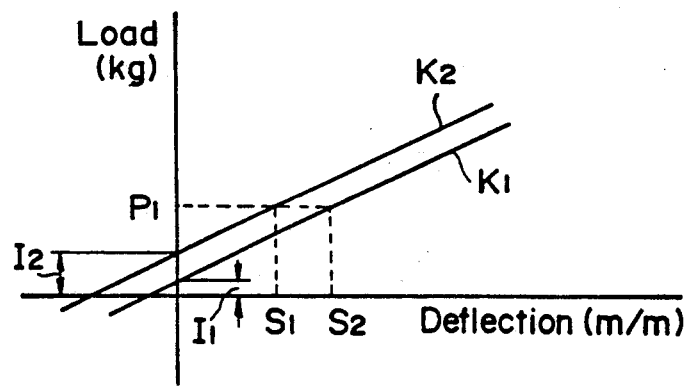
FIG. 19 is a graphic view of a displacement vs. load curve of the suspension spring of a front fork having an apparatus for adjusting the height of vehicle of a type in which ther initially set load may be changed.
Figure 20:
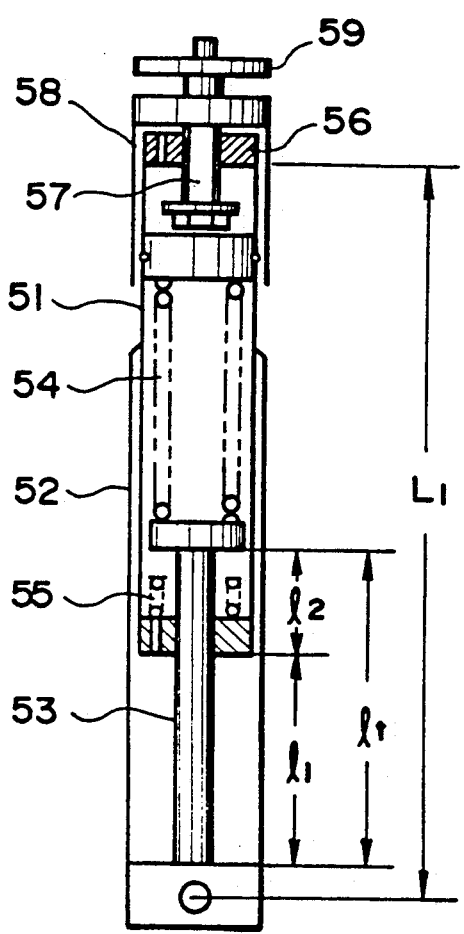
FIG. 20 is a schematic view illustrating a state prior to increase of the height of vehicle, in which a rider rides on a two-wheeled vehicle having a conventional front fork the entire length of which may be changed.
Figure 21:
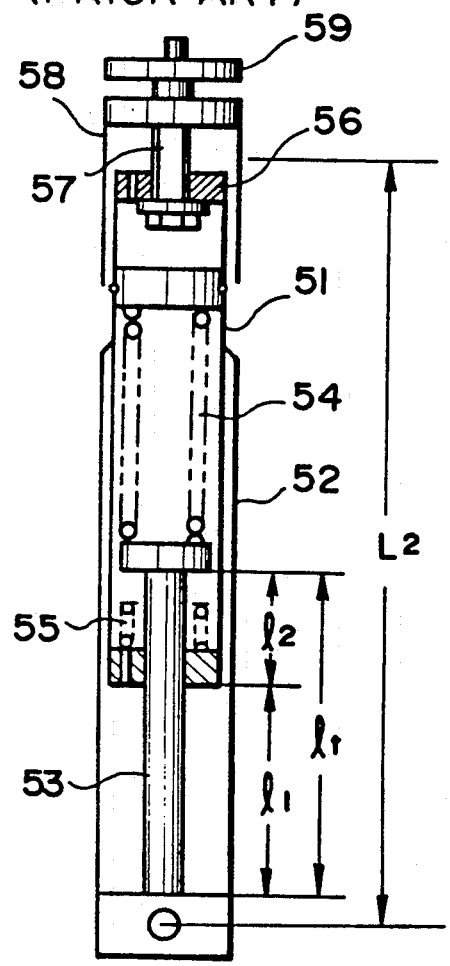
FIG. 21 is a schematic view illustrating a state of the front fork of FIG. 20 after the height of vehicle is increased.

FIG. 7 illustrates a longitudinal view, in cross section, of a front fork for use in an automatic two-wheeled vehicle, having an apparatus for adjusting the height of vehicle according to the present invention.

Within the outer barrel 322 mounted at the side of axle is slidably fitted an inner barrel 321 mounted at the side of the body of vehicle. At the bottom portion of the outer barrel 322 is rigidly fixed a damper cylinder 323 via an oil lock piece 324 by means of a bolt 326 screwed into an end piece 325. As usual, a bottom piece 327 provided with a damper means at the compression side is attached at the upper portion of the end piece 325. A piston rod 329 upwardly extends within the inner barrel 321 from a piston 328 which may be slided within the damper cylinder 323 through a rod guide 330 at the top portion of the damper cylinder 323. A suspension spring 333 is suspended between a spring bearing 331 fixed to the pistoin rod 329 and a suspension bearing 332 fixed to the upper end of the damper cylinder 323. As usual, a damper means at the extension side is provided at the piston 328. 334 denotes a rebound spring. The above-described front fork is a known type called a damperbuilt-in front fork or cartridge type front fork. Masses positioned above the spring are the inner barrel 321, apparatus 340 for adjusting the height of vehicle, piston rod 329 and piston 328 while masses positioned below the spring are the outer barrel 322, oil lock piece 324 and the damper cylinder 323.

The apparatus for adjusting the height of vehicle according to this embodiment is provided at the upper end portion of the inner barrel 321. The apparatus 340 for adjusting the height of vehicle has a cylinder 341 for adjusting the height of vehicle, which is formed in the interior of a fork bolt 342 inserted and fixed at the upper end of the inner barrel 321. At the upper end of the piston rod 329 extending through a cover 343 at the lower end of the cyliinder 341 into the cylinder 341 is fixed a piston 344 for adjusting the height of vehicle, which is slidably fitted with the cylinder 341. On the outer periphery of the fork bolt 342 is formed an annular groove 345, which, on the one hand, communicates with the lower chamber of the cylinder 341 through a through-hole 346 and, on the other hand, communicates with a port 348 of a ring member 347 through a through hole and an annular groove 350. Meanwhile, a port 351 is bored through the upper chamber of the cylinder 341.

Next, the operation of the apparatus for adjusting the height of vehicle arranged as above is described with reference to FIGS. 8 and 9. FIG. 8 illustrates a state of a front fork prior to adjustment of the height of vehicle, in which a rider rides on an automatic two-wheeled vehicle. When he runs from the flat urban area into the wasteland, a pressurized oil is supplied from the port 351 to the upper chamber of the cylinder 341. At this time, for ease of understanding, assuming that the piston 344 and the piston rod 329 integral therewith stand still, the inner barrel 321 is upwardly moved within the outer barrel 322 with the result that a mounting dimension between a bracket mounted at the vehicle body (not shown) fixed on the outer periphery of the inner barrel and an axle (not shown) fixed to the lower portion of the outer barrel is made longer to increase the height of vehicle. At this time, although the total stroke is increased from $l_1$ to $l_2$ by a stroke of the piston 344, since the suspension spring is not compressed, its initially set load does not change. Since the position of the piston in the unloaded condition within the damper cylinder 323 remains the same, the amount of a rebound stroke within the damper cylinder also remains the same. At the time of maximum compression a the oil lock collar at the tip end of the inner periphery of the inner barrel 321 fits with the oil lock piece 324 at the lower end of the outer barrel, the dimensions of the front fork are the same as the height of vehicle is lowered as in FIG. 8, and as increased as in FIG. 9.

FIGS. 22 and 23 respectively illustrate a rear cushion of an automatic two-wheeld vehicle according to a fourth embodiment of the present invention, having an apparatus 420 for manually adjusting the height of vehicle using a screw. The cross section of FIG. 23 forms a angle of 90° with respect to the one of FIG. 22.

This rear cushion 410 has a damper cylinder 411 and a piston rod 412 downwardly protruding from a slidable piston (not shown) through this damper cylinder. One bearing 413 is connected to the piston rod 412 via the apparatus 420 for adjusting the height of vehicle, which will be described later, and the other spring bearing 414 is fixed to the cylinder 411, a suspension spring 415 being disposed therebetween. Incidentally, 416 denotes a mounting member at the side of the vehicle body and 417 a mounting member at the side of axle.

The apparatus 420 for adjusting the height of vehicle according to the present invention is provided at the lower portion of the rear cushion and a hollow portion 421 having an inner periphery through which the piston rod slides is provided at the mounting member 417 at the side of axle. A threaded portion 422 is formed on the outer periphery and elongated holes 423, 423' pierced through from the outside in the axial direction up to the hollow portion 421 are provided at positions opposed to each other. At the lower end of the piston rod 412 is attached a key 424 serving as a member for connecting the spring bearing so as to radially protrude in both directions, the key being vertically slidable within the axial elongated holes 423, 423' of the mounting member 417 at the side of axle. At the threaded portion 422 of the outer periphery of the mounting member is screwed an adjuster 425 for adjusting the height of vehicle, on which the inner periphery of which is formed a recessed portion 426 which both ends of the key 424 protruding from the piston rod 412 enter.

An intermediate member 427 is interleaved between the adjuster 425 and the spring bearing 415. 428 denotes a bearing of the damper rubber, which is screwed into the threaded portion 422 at the upper end of the mounting member 417 and 429 a damper rubber.

The operation of the apparatus 420, arranged as above, for manually adjusting the height of vehicle using a screw is hereinafter described. FIG. 22 shows a state prior to adjustment of the height of vehicle, which is suitable for running on the fat urban area. When the rider runs on the wasteland, the adjuster 425 is turned in one direction. In this case, for ease of understanding, assuming that the piston rod 412 stands still, since the key 424 of the piston rod engages the elongated axial holes 423, 423 of the mounting member 417 to inhibit its rotation, by rotation of the adjuster 425, only the mounting member 417 engaging therewith is downwardly shifted with respect to the piston rod 412 so that the mounting length is increased by the adjusted height of vehicle from $L_1$ up to at most $L_2$ (FIG. 23). At the same time, the stroke is also increased by the adjusted height from $S_1$ up to at most $S_2$. Consequently, the height of vehicle can be set to arbitrary position. Since the spring bearing 413 remains still, the suspension spring 415 remains still without being displaced and therefore its initially set load does not change.

Next, the front forks 30 of an automatic two-wheeled vehicle are respectively shown in FIGS. 25 and 26 having an apparatus according to a fifth embodiment for manually adjusting the height of vehicle using a screw. The cross section of FIG. 26 forms an angle of 90° with respect to the one of FIG. 25.

An inner barrel 432 having a mounting member at the side of vehicle body at the upper portion thereof is slidably fitted within an outer barrel 431 having a mounting member at the side of axle (not shown) at the lower end thereof while a piston 434 is slidably fitted with a damper cylinder 433 upwardly extending from the bottom portion of the outer barrel 431, and a piston rod 435 upwardly extends from this piston 434 through a rod guide 433a of the damper cylinder 433 to be connected to a cover member 436 at the upper end of the inner barrel 432. A spring bearing 437 is mounted at the upper end of the damper cylinder 433 and a suspension spring 439 is disposed between this spring bearing 437 and the other spring bearing 438 fixed to the piston rod 435. 440 denotes a rebound spring.

The apparatus 441 according to the present invention is provided at the upper portion of the inner barrel 432 and a threaded portion 442 is provided on the outer periphery at the upper portion of the piston rod 435. As seen in FIG. 27, parallel surfaces 443, 443' oppoed to each other at the same distance from the center of axis are formed as the engaging portions. The threaded portion 442 of the piston rod 435 is fitted with a femal thread portion 444 at the lower end portion of a cover member 436 fixed to the upper end of the inner barrel 432. In addition, a columnar adjuster 446 is fitted with a cylindrical hole 445 formed in the cover member 436, this adjuster being connected to the piston rod 435 by means of a groove (see FIG. 27) having inner surfaces 447, 447 which contact both surfaces 443, 443 of the threaded portion 442. Incidentally, a stopper pin 448 for limiting an increase of the height of vehicle is attached at the upper end of the piston rod 435 so that the rod 435 may not be removed. 449 is an end plate and 450 a cap.

Now, the operation of the apparatus 441 arranged as above is described.

FIG. 25 shows a state prior to adjustment of the height of vehicle, which is suitable for running on the urban area. When a rider runs from this condition into the wasteland, if an adjusting knob 446a of the adjuster 446 is turned, since both flat surfaces 443, 443' of the threaded portion 442 of the piston rod 435 are fitted with the groove of the adjuster, the piston rod 435 is rotated together with the adjuster 446. Considering that the piston rod 435 is rotated at its position without being moved vertically, the femal thread portion 444 fitted with the threaded portion 442, hence the cover member 436 is upwardly moved together with the adjuster 446 so that the height of vehicle is increased from $L_1$ by the adjusted height. At the same time, the stroke of the inner barrel 433 is also increased from $S_1$ to $S_2$ by the adjusted amount of height. FIG. 26 shows a state in which the stopper pin 448 of the piston rod 435 abutted against the bottom of the cylindrical hole 445 of the adjuster 436, the height of vehicle being adjusted to maximum extent. In the apparatus of the present invntion, since the suspension spring 439 is not compressed, its initially set load cannot change. Besides, as the time of maximum compression as the oil lock collar at the lower end of the inner barrel 432 fits with the oil lock piece at the lower end of the outer barrel 431, the dimensions of the front fork are the same before (FIG. 25) and after (FIG. 26) the height of vehicle is adjusted.

FIGS. 29 and 30 respectively show the lower portion of a rear cushion 520 of an automatic two-wheeled vehicle according to a sixth embodiment of the invention, having a hydraulic appraratus for adjusting the height of vehicle. The cross section of FIG. 30 forms an angle of 90° with respect to the one of FIG. 29.

Figure 33:
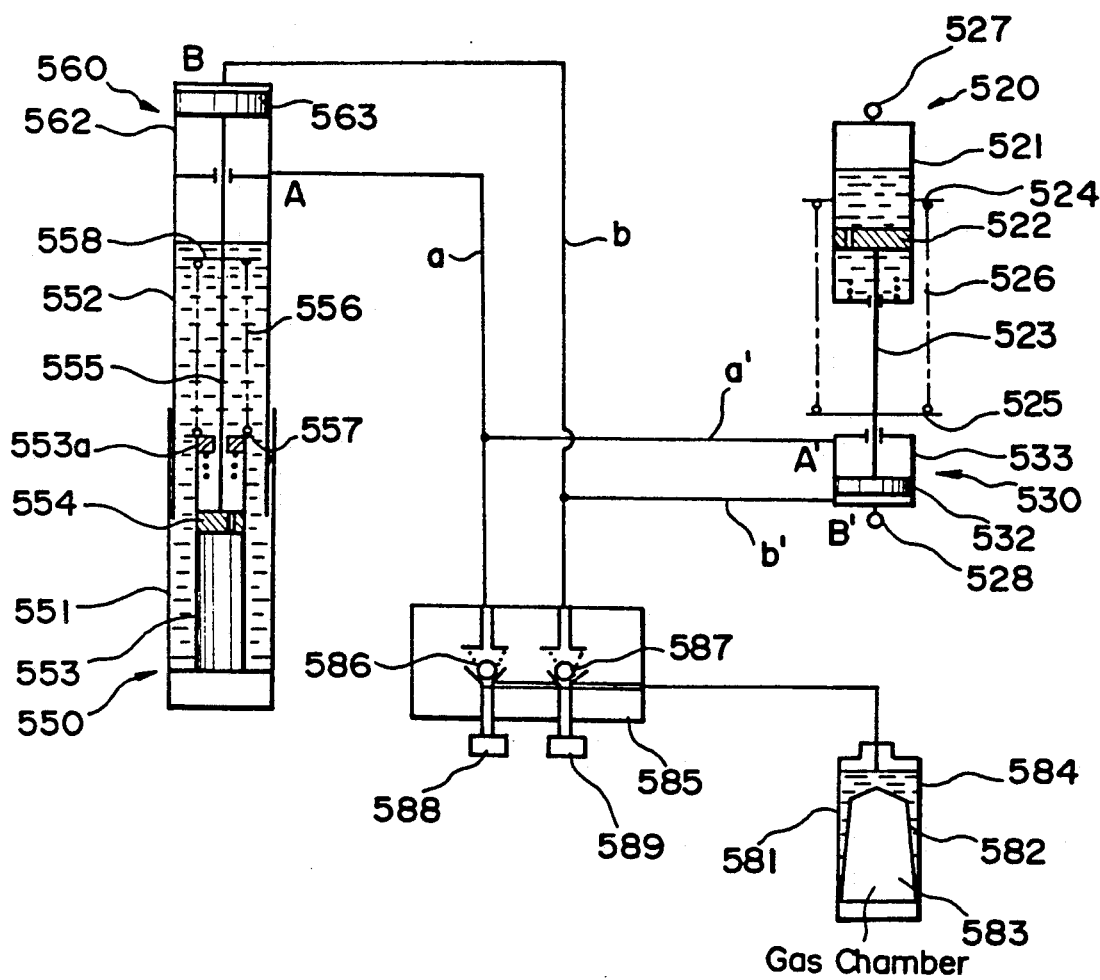

This rear cushion has a piston rod 523 protruding from a piston 522 which may slide within a damper cylinder 521 (see FIG. 33). A suspension spring 526 is disposed between an upper spring bearing 524 fixed to the damper cylinder 521 and a lower spring bearing 525 attached to the piston rod 523. 527 denotes a mounting member at the side of vehicle body, 528 a mounting member at the side of axle and 529 a damper rubber.

A gas-filled hydraulic apparatus 530 for adjusting the height of vehicle according to the present invention has a piston for adjusting the height of vehicle which is fixed to the piston rod 523 via a rod 531, and a cylinder 533 for adjusting the height of vehicle, which is formed at the mount 528 at the side of axle. An opening at the upper end of the cylinder 533 is closed by means of a cover 534. The spring bearing 525 is connected to the piston rod 523 via a planar connecting member 535 upwardly protruding from the cylinder 533 of the member 528, on which is supported a stopper rubber 529 via a stopper rubber sheet 536 having a plurality of leg portions 536a. An opening portion 535a through which the leg portions 536a pass is provided at the connecting member 535 so that the stopper rubber sheet 536 may be displaced together with the cylinder 533. 537 denotes a lock nut.

A tube joint 539 is connected to a port B' leading to a lower chamber of the cylinder 533, which is defined by the piston 532 while a tube joint 542 of a port A' is connected at a notched portion 540 communicating with an upper chamber via a through hole 541 extending through the wall of cylinder.

Figure 31:
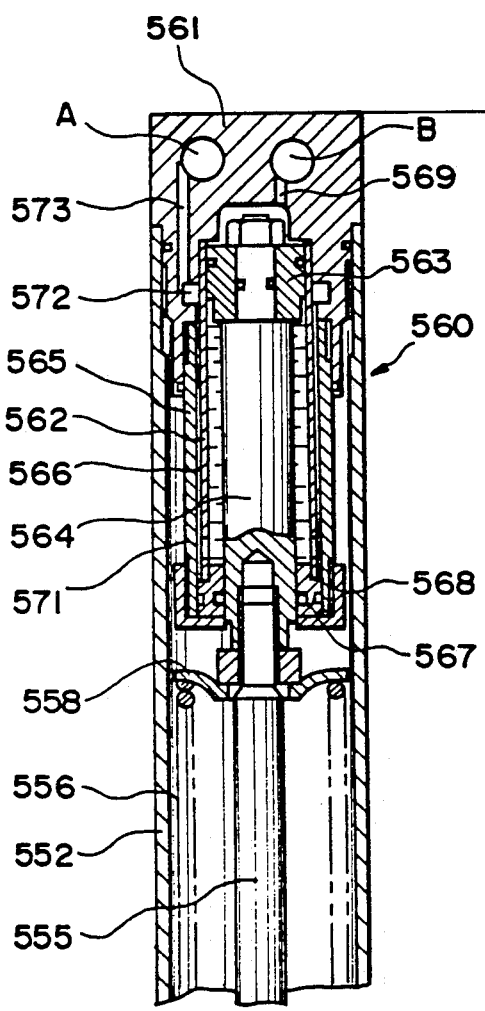
FIG. 31 is a partial cross-sectional view of a front fork of a two-wheeled vehicle prior to adjustment of the height of vehicle, having an apparatus for ajusting the height of vehicle according to the present invention.
Figure 32:
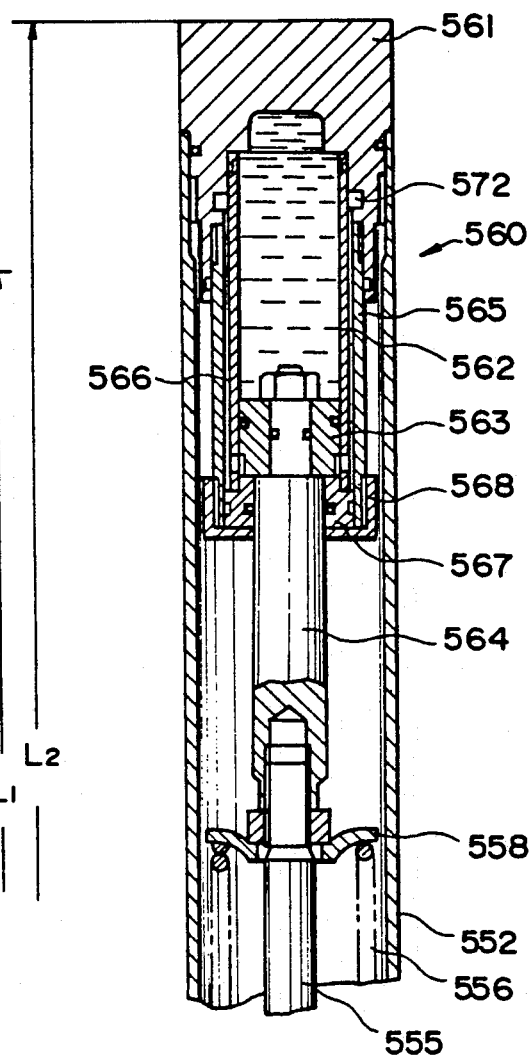
FIG. 32 is a partial cross-sectional view illustrating a state of the front fork of FIG. 31 after the height of vehicle is increased; an FIG. 33 is a hydraulic circuit diagram for operating gas-filled apparatus 30 and 60 for adjusting the height of vehicle of a front fork and a rear cushion.

Next, FIGS. 31 and 32 respectively show a front fork 550 of an automatic two-wheeled vehicle according to a seventh embodiment of the present invention, having an apparatus for adjusting the height of vehicle.

An inner barrel 552 is slidably fitted through an outer barrel 551 (see FIG. 33) and a piston 554 is slidably fitted within a damper cylinder extending from the bottom portion of the outer barrel extending from the bottom portion of the outer barrel 551, a piston rod 555 upwardly extending through a rod guide 553a from this piston. A suspension spring 556 is disposed between a spring bearing 557 at the upper end of the damper cylinder and a spring bearing 558 fixed to the piston rod 555.

In this apparatus of the front fork according to the invention, a hollow portion the lower side of which is open is formed at the lower portion of a cover member 561 screwed into the upper end of the inner barrel 552, which is a member mounted to the side of vehicle body, a cylinder 562 for adjusting the height of vehicle being inserted from below into this hollow portion. A piston 563 for adjusting the height of vehicle is slidably fitted wtin this cylinder 562. A rod 564 connected to the piston rod 555 by means of a screw is screwed into this piston 563. Further, at the lower side of the cover member 561 is screwed an outer barrel 565 having an inner periphery spaced apart from the outer periphery of the cylinder 562 to thereby form an annular passageway 566 through which oil flows, between the outer barrel 565 and the cylinder 62. An end plate 567 is attached to the lower end of the cylinder 562 and a cap 568 for supporting the end plate 567 is screwed into the outer barrel 565.

As an oil passageway for supplying a pressurized oil to this cylinder 562 is connected a port B to an oil passageway 569 leading to an upper oil chamber defined by the piston 563 while a through hole 571 leads to a lower chamber, this through hole communicating via the above-mentioned annular oil passageway 566 with an upper oil passageway 572, from which the through hole further communicates via an oil passageway 73 with a port A.

FIG. 33 shows a hydraulic circuit for operating apparatus 530 and 560 of the front fork and rear cushion for adjusting the height of vehicle. 581 is a tank having therein a gas chamber 583 and an oil chamber 584 partitioned by a resilient partitioning member 582, a pressurized gas of about 50 to 60 kg f/cm$^2$ being sealed therein. At a controller portion 585 are provided an oil chamber 584 within the tank, check valve 586 disposed along lines a,a' connecting the port A of the lower side oil chamber of the front fork and the port A' of the upper side oil chamber of the rear cushion, oil chamber 584 within the tank, check valve 587 disposed along lines b,b' connecting the front fork, port B of the upper side oil chamber of the rear cushion and the port B' of the lower side oil chamber of the same and buttons 588 and 589 for respectively increasing and lowering the height of vehicle, which are the check valve relieving means for opening these check valves 586, 587. These check valves 586, 589 are both disposed in directions inhibitting a reverse flow from the oil chamber of the cylinder.

The operation of the above-described apparatus of the rear cushion is described mainly with reference to FIG. 33.

FIG. 29 (rear cushion) and FIG. 31 (front fork), which referrs to the states prior to increase of the height of vehicle, respectively illustrate a state in which a pressure of the sealed gas within the tank 581 passes through the check valves 586, 587 and the lines a, b and a', b' to act on the upper and lower surfaces of the pistons 532, 563 while a rider is riding on the vehicle, so that a balance of weight is achieved. In this state, the fluctuation of the pressure caused by a vibration of the upper and lower surfaces of the pistons 532 and 563 is inhibitted from being transmitted to the oil chamber 584 of the tank 581 because of the presence of the check valves 586 and 587. At this time, since the upper and lower chambers of the piston 532 of the rear cushion communicate with each other through the line a' which may communicates with the line a, and the line b' which may communicate with the line b, the lower chamber of the piston 563 of the front fork and the upper chamber of the piston 532 of the rear cushion communicate with each other with the result that the same pressure is achieved therein. Hence, an area where the pressure is apllied to the piston of the rear cushion subjected to the pressure is correspondingly increased because it is subjected to a great suspending load.

When the rider runs from the urban area into the wasteland, if he gets off the vehicle and connects a front portion of the vehicle body to the suspending inner barrel 552 of the front fork, for eample, raises a handle or the like with respect to the outer barrel 551, wheel and the like, the oil chamber below the piston 563 is compressed with the result that the oil passes from the port A through the line a to act on the check valve 586. At this time, since the check valve 586 inhibits this flow of oil, if he presses the buttton 588 to let a ball of the check valve off a valve seat to open it, a hydraulic oil passing therethrough pushes up the check valve 587 to pass through the line b to flow into an oil chamber above the cylinder 563 of the front fork so that the cylinder 562 and the inner barrel connected therewith may be raised with respect to the outer barrel 551. Also, in the rear cushion if he lifts the rear body of vehicle and rocks the body in the forward and rearward directions to compress the upper oil chamber of the piston 532, the hydraulic oil passes through the oil passageway a' to reach the check valve 586. At this time, since the check valve 586 is separated off the seat portion lifted by a push rod at the tip end of the button 588 for lifting the height of vehicle, the oil passes through the check valve 586 to reach the check valve 587. Since the check valve 587 opens against this flow of oil, the oil passes through the check valve 587 and the passageway b' to flow into the lower chamber of the piston so that the cylinder 53 is downwardly displaced with respect to the piston 532 to increase the height of vehicle. Thus each mounting length of the front fork and the rear cushion is increased so that the height of vehicle is increased from $L_1$ to $L_2$, as shown in FIGS. 32 and 30. In this state, the fluctuation of pressure within the upper and lower chambers of the pistons 532 and 563 is prevented by means of the chech valves 586 and 587 and is not transmitted to the tank. That is, the height of vehicle is locked in that increased condition.

Next, when the height of vehicle is lowered from this condition, if a button 589 for lowering the height of vehicle is pressed to relieve the check valve 587, then the lines b and b' communicate with the lines a and a' via the check valve 586. At this time, if the rider applies or relieves his weight back and forth, keeping his riding posture, to move the inner barrel 552 and the cylinder 562 up and down, then the hydraulic oil within the upper chamber of the piston 563 passes from the line b through the check valves 587 and 586 into the line a to flow into the lower oil chamber of the piston 563 so that the cylinder 562 and the inner barrel 552 are lifted. Similarly, the hydraulic oil within the lower chamber of the piston is compressed and passes through the line b' and the check valves 587 and 586 and further the line a' to flow into the upper oil chamber of the piston so that the cylinder 533 may upwardly move with respect to the piston 532. As a result, the height is lowered from $L_2$ to $L_1$. Since the enlarged and contracted chambers (the opposite is the case as the height of vehicle is decreased) of the front fork and rear cushion are connected, as the height of vehicle is raised, by the lines a and a' and the lines b and b', an excellent balance between the heights of the vehicle taken in lateral direction can effectively be achieved by properly setting the area of the piston to which the pressure is applied.

As in this embodiment, when the oil chamber of the piston of the front fork and that of the cylinder of the rear cushion are branched at the downstream of the check valves 586 and 587, since the pressurizing tank 581 and the check valves 586 and 587 can be used in common, only one pressurizing tank 581 is necessary thus reducing the installation cost.

It is apparent that the pressure tank and the check valve can be respectively provided by one to the front fork and the rear cushion.

What is claimed is:

1. A hydraulic shock absorber for a vehicle comprising:
   a damper cylinder;
   a piston slidably fitted in said damper cylinder, said piston having a compression stroke and a rebound stroke;
   a piston rod extending from said piston through an end portion of said cylinder;
   a first mounting member for mounting a cylinder end of said shock absorber to one of a body portion and an axle of said vehicle;
   a second mounting member for mounting an end of said shock absorber opposite said cylinder end to the other of said body portion and axle of said vehicle;
   a first spring bearing secured to said damper cylinder;
   a second spring bearing secured to said piston rod;
   a suspension spring interposed between said first and second spring bearings; and,
   height adjusting means for changing the spacing between said first and second mounting means by changing the compression stroke of said piston with neither the rebound stroke of said piston nor the spacing between said first and second spring bearings changing.

2. A hydraulic shock absorber in accordance with claim 1 wherein said piston compression stroke is defined between an end face of said second mounting member and an end face of said damper cylinder;

said second mounting member is axially displaceable relative to said second spring bearing and said vehicle height adjusting means includes means for axially displacing said piston rod between said end face of said second mounting member and said end face of said damper cylinder whereby to control said shock absorber compression stroke.

3. A hydraulic shock absorber in accordance with claim 2 wherein said second mounting member is connected to a second cylinder through which said piston rod extends and said means for axially displacing said piston rod includes a second piston slidably fitted within said second cylinder.

* * * * *